United States Patent
Van Riel et al.

(10) Patent No.: US 9,657,166 B2
(45) Date of Patent: *May 23, 2017

(54) POLYMERIC COMPOSITIONS AND PROCESSES FOR MOLDING ARTICLES

(71) Applicant: TRINSEO EUROPE GMBH, Horgen (CH)

(72) Inventors: Norwin Van Riel, Aardenburg (NL); Pascal E. R. E. J. Lakeman, Breda (NL)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,604

(22) Filed: Oct. 29, 2015

(65) Prior Publication Data

US 2016/0046799 A1 Feb. 18, 2016

Related U.S. Application Data

(63) Continuation of application No. 12/256,301, filed on Oct. 22, 2008, now Pat. No. 9,187,631.

(60) Provisional application No. 60/981,658, filed on Oct. 22, 2007.

(51) Int. Cl.

| C08L 51/06 | (2006.01) |
|---|---|
| C08L 23/14 | (2006.01) |
| C08F 290/04 | (2006.01) |
| C08K 3/40 | (2006.01) |
| C08F 297/08 | (2006.01) |
| C08L 23/08 | (2006.01) |
| C08L 23/10 | (2006.01) |
| C08L 23/12 | (2006.01) |
| C08L 53/00 | (2006.01) |

(52) U.S. Cl.
CPC .......... *C08L 23/142* (2013.01); *C08F 290/04* (2013.01); *C08F 290/042* (2013.01); *C08F 290/046* (2013.01); *C08F 297/08* (2013.01); *C08F 297/083* (2013.01); *C08K 3/40* (2013.01); *C08L 23/0815* (2013.01); *C08L 23/10* (2013.01); *C08L 23/12* (2013.01); *C08L 51/06* (2013.01); *C08L 53/00* (2013.01); *C08L 2205/02* (2013.01); *C08L 2207/04* (2013.01)

(58) Field of Classification Search
CPC .. C08F 297/083; C08F 297/08; C08F 290/04; C08F 290/046; C08F 290/042; C08L 51/06; C08L 53/00; C08L 23/10; C08L 23/12; C08L 23/0815; C08K 3/40

See application file for complete search history.

(56) References Cited

U.S. PATENT DOCUMENTS

| 4,798,081 | A | 1/1989 | Hazlitt et al. |
|---|---|---|---|
| 5,272,236 | A | 12/1993 | Lai et al. |
| 5,278,272 | A | 1/1994 | Lai et al. |
| 5,484,835 | A | 1/1996 | Sobajima et al. |
| 5,834,056 | A | 11/1998 | Lutz |
| 6,300,419 | B1 | 10/2001 | Sehanobish et al. |
| 6,403,692 | B1 | 6/2002 | Traugott et al. |
| 6,498,214 | B2 | 12/2002 | Laughner et al. |
| 6,521,693 | B2 | 2/2003 | Saito et al. |
| 6,525,157 | B2 | 2/2003 | Cozewith et al. |
| 6,844,059 | B2 | 1/2005 | Bernd et al. |
| 6,949,605 | B2 | 9/2005 | Shankernarayanan et al. |
| 7,087,680 | B2 | 8/2006 | Pierini et al. |
| 7,355,089 | B2 | 4/2008 | Chang et al. |
| 7,632,888 | B2 | 12/2009 | Van Poucke et al. |
| 2002/0156176 | A1 | 10/2002 | Saito et al. |
| 2003/0204017 | A1 | 10/2003 | Stevens et al. |
| 2005/0288393 | A1 | 12/2005 | Lean et al. |
| 2006/0211819 | A1 | 9/2006 | Hoenig et al. |
| 2007/0010616 | A1 | 1/2007 | Kapur et al. |
| 2007/0066756 | A1 | 3/2007 | Poon et al. |
| 2007/0123615 | A1 | 5/2007 | Mecklenburg et al. |
| 2007/0275219 | A1 | 11/2007 | Patel et al. |
| 2008/0199689 | A1 | 8/2008 | Van Poucke et al. |
| 2009/0105404 | A1 | 4/2009 | Van Riel et al. |

FOREIGN PATENT DOCUMENTS

| EP | 0129368 A1 | 12/1984 |
|---|---|---|
| EP | 0495099 A1 | 7/1992 |
| EP | 0663418 A1 | 7/1995 |

(Continued)

OTHER PUBLICATIONS

Copending Application No. PCT/US2005/008917, filed Mar. 17, 2005, published as WO2005/090427 (63558D) on Sep. 29, 2005 by Arriola et al.
Copending Application, U.S. Appl. No. 12/256,217, filed Oct. 22, 2008 66034A and published as 2009/105404A1 on Apr. 23, 2009 by van Riel et al.
Wunderlich, Macromolecular Physics, vol. 3, Crystal Melting, Academic Press, NY 1980, p. 48.
F. Rodriguez, Principles of Polymer Systems, $2^{nd}$ Ed., Hemisphere Publishing Corporation, Washington, 1982, p. 54.
Markovich et al., "Development of gel-permeation chromatography-Fourier transform infrared spectroscopy for characterization of ethylene-based polyolefin copolymers." Polymeric Materials Science and Engineering (1991), 65, 98-100.

(Continued)

*Primary Examiner* — Peter D Mulcahy

(74) *Attorney, Agent, or Firm* — The Dobrusin Law Firm, P.C.

(57) ABSTRACT

The present invention is directed to a polymeric article comprising a blend of (a) a first polymeric component; (b) a second polymeric component the second polymeric component including an α-olefin multilock interpolymer present in the amount of about 20 percent or less by weight of the second polymeric component; and (c) at least one reinforcement material; wherein the concentration of the second polymeric component is greater than about 20 wt. % based on the total concentration of the first polymeric component and the second polymeric component. The polymeric articles desirably have one or more of the following characteristics: a soft touch feel, a low gloss appearance, or a high surface durability.

19 Claims, No Drawings

(56) References Cited

FOREIGN PATENT DOCUMENTS

| | | |
|---|---|---|
| EP | 0812882 A1 | 12/1997 |
| EP | 1236771 A1 | 9/2002 |
| WO | 03/040201 A1 | 5/2003 |
| WO | 2005/090427 A2 | 9/2005 |
| WO | 2005/090451 A1 | 9/2005 |
| WO | 2005/111145 A1 | 11/2005 |
| WO | 2006/101915 A2 | 9/2006 |
| WO | 2006/101924 A2 | 9/2006 |
| WO | 2006/101926 A2 | 9/2006 |
| WO | 2006/101928 A2 | 9/2006 |
| WO | 2006/101930 A2 | 9/2006 |
| WO | 2006/101932 A2 | 9/2006 |
| WO | 2006/101966 A1 | 9/2006 |
| WO | 2006/101968 A2 | 9/2006 |
| WO | 2006/102152 A2 | 9/2006 |
| WO | 2006/102154 A2 | 9/2006 |
| WO | 2006/102155 A2 | 9/2006 |
| WO | 2006/113000 A2 | 10/2006 |
| WO | 2007/025663 A1 | 3/2007 |
| WO | 2007/050356 A1 | 3/2007 |
| WO | 2007/071438 A1 | 6/2007 |
| WO | 2007/082571 A1 | 7/2007 |
| WO | 2007/146875 A2 | 12/2007 |
| WO | 2008/030953 A1 | 3/2008 |

OTHER PUBLICATIONS

P.J. Deslauriers, et al., Quantifying short chain branching microstructures in ethylene-1 olefin copolymers using size exclusion chromatography and Fourier transform infrared spectroscopy (SEC-FTIR0, Polymer (2002), 43, 59-170.

Williams et al., Journal of Polymer Science, Polymer Letters, vol. 6, p. 621 (1968).

L. Wild, et al., Journal of Polymer Science: Polymer, Physics Ed., 20, 441-455 (1982).

J.C. Randall, JMS-Rev. Macromol. Chem. Phys., C29, 201-317 (1989).

Copending, U.S. Appl. No. 11/893,449, filed Aug. 16, 2007, published as 2008-0199689, on Aug. 21, 2008, 65679B.

International Search Report, Application No. PCT/US2008/080806, dated Feb. 2, 2009 67447B.

Translation of Office Action dated Jan. 30, 2012 for copending Chinese Patent Application No. 200880112694.0.

A.R. Kamdar et al., "Mischibility of Novel Block Copolymers", ANTEC 2007 Plastics: Annual Technical Conference Proceedings, section D29, 2007, Knovel Corporation.

H. Wang et al., "Comparison of Block and Random Ethylene-Octene Copolymers Based on the Structure and Elastomeric Properties", ANTEC 2007 Plastics: Annual Technical Conference Proceedings, section D29, 2007, Knovel Corporation.

POLYMERIC COMPOSITIONS AND PROCESSES FOR MOLDING ARTICLES

CLAIM OF PRIORITY

The present application claims the benefit of U.S. Provisional Patent Application No. 60/981,658 (filed on Oct. 22, 2007) which is hereby incorporated by reference in its entirety for all purposes.

FIELD OF THE INVENTION

The present invention relates to an improved polyolefin composition and processes regarding the same. More particularly, the present invention relates to blended polyolefinic materials which after molding provide a high quality surface appearance and/or improved durability. Specifically, the present invention relates to polymeric compositions suitable for molding articles in color having with one, two, three, or even all of the following characteristics: low gloss, good gloss uniformly, highly durable surface quality and a soft-touch tactile feel.

BACKGROUND OF THE INVENTION

Much effort has been put into developing polymeric compositions that exhibit desirable properties, lower costs, or both. For some applications, it is desirable to improve one or more of the following: the tactile characteristics of the polymeric articles the low gloss surface appearance, or the durability characteristics. For instance, vehicle passengers contact various automotive interior articles and it is desirable to employ a material for these articles that has a soft touch tactile sensation and is durable and withstanding frequent touching and scratching. Among the ways to impart a soft touch feel, low gloss appearance and high surface durability is to use a multi step process applying a secondary layer of functional material on top of a molded article through overmoulding, painting or other technique. Other ways to impart a soft touch feel, low gloss appearance and high surface durability is a modification of a thermoplastic material to suit the desired properties.

Examples of prior polymeric compositions and processes of forming those compositions are discussed in: U.S. Pat. Nos. 6,300,419; 6,949,605; 6,498,214, U.S. Patent Publication 2005/0288393, and WIPO Publication 2007/025663A1 all of which are hereby expressly incorporated by reference for all purposes.

U.S. Patent Application Publication No. 2007/0010616, PCT Application Nos. PCT/US2005/008917 (filed on Mar. 17, 2005), and PCT International Patent Application Publication Nos. WO2006/102165A2 (filed Mar. 15, 2000), WO2006/101966A1 (filed Mar. 15, 2006), WO2006101932A2 (filed Mar. 15, 2006), and WO2006102155A2 (filed Mar. 15, 2006), all of which are expressly incorporated herein by reference in there entirety, describe block (i.e., blocky) copolymers of a lower α-olefin (LOA) and a second α-olefin (i.e., LOA/α-olefin interpolymers such as ethylene/α-olefin interpolymers) which may be soft thermoplastics and blends with polypropylene having improved mechanical properties.

PCT International Patent Application Publication No. WO2003/040201 A1 (filed on May 6, 2002), published US Patent Application No. 2003/0204017 (filed on May 5, 2002), European Patent No. 0495009 (filed on Dec. 12, 1989), European Patent Application No. 129368 (filed on Jun. 5, 1984) and U.S. Pat. No. 6,525,157 (issued on Feb. 25, 2003), U.S. Pat. No. 6,403,692 (issued Jun. 11, 2002), and U.S. Pat. No. 5,272,236 (issued Dec. 21, 1983) all of which are expressly incorporated herein by reference in there entirety, describe linear or substantially linear ethylene polymers (S/LEP) which may be soft thermoplastics and polymeric blends including a S/LEP.

International Patent Application Publication WO 03/040201 A1 filed on May 6, 2002, published US Application No. 2003/020407 filed on May 5, 2002, and U.S. Pat. No. 6,525,157 issued on Feb. 25, 2003, all of which are incorporated by reference, describe polypropylene elastomers which may be soft thermoplastics, and polymeric blends using a propylene elastomer.

Still, it remains desirable to provide a polymeric composition, particularly, a shaped thermoplastic polyolefin composition that can exhibit a relatively soft-touch feel and withstand the conditions encountered in vehicle interior applications, such as substantially low gloss, mar resistance, scratch resistance, low temperature ductility, dimensional stability, or any combination thereof. It would be particularly attractive to accomplish this without the need to use relatively high cost or highly processed (e.g. grafted) polymers, specialty fillers or agents, or other additional or alternative relatively costly ingredients, processes, multi-layered structures (such as coatings) or the like while still maintaining desirable characteristics.

SUMMARY OF THE INVENTION

In one aspect, the invention is directed at a soft-touch feel polymeric composition comprising a blend of: a first polymeric component including a relatively hard thermoplastic; a second polymeric component including a relatively soft thermoplastic, wherein the relatively soft thermoplastic is a lower-α-olefin/α-olefin interpolymer (LOA/α-olefin interpolymer) which is a multiblock copolymer having one or more hard blocks and one or more soft blocks; and at least one reinforcement material, wherein the concentration of the second polymeric component is greater than about 10 wt. % (e.g., greater than about 20 wt. %) based on the total concentration of the first polymeric component and the second polymeric component.

This aspect of the invention may be further characterized by one or any combination of the following features: the LAO/α-olefin interpolymer has at least two hard blocks and at least two soft blocks; the LAO/α-olefin interpolymer is a LAO/α-olefin interpolymer containing a lower-α-olefin (LOA) which is ethylene or propylene and at least one second different α-olefin having 3 to 12 carbon atoms, and the LAO/α-olefin interpolymer is characterized by one or any combination of the following: the LAO/α-olefin interpolymer has a Mw/Mn from about 1.7 to about 3.5, at least one melting point, Tm, in degrees Celsius, and a density, d, in grams/cm$^3$, wherein d≤0.900, and the numerical values of Tm and d correspond to the relationship: Tm≥1000(d)−790 (e.g., Tm>−2002.9+4538.5(d)−2422.2(d)$^2$), the LAO/α-olefin interpolymer has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships: ΔT>−0.1299(ΔH)+62.81 for ΔH greater than zero and up to 130 J/g, ΔT≥48° C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C., the LAO/α-olefin interpolymer is characterized by an elastic recovery, Re, in percent at 300 percent strain and 1 cycle measured with a compression-molded film of the LAO/α-olefin interpolymer, and has a density, d, in grams/cm³, wherein the numerical values of Re and d satisfy the following relationship when ethylene/α-olefin interpolymer is substantially free of a cross-linked phase: Re>1481-1629(d), the LAO/α-olefin interpolymer has a molecular faction which elutes between 40° C. and 130° C. when fractionated using TREF, characterized in that the fraction has a molar comonomer content of at least 5 percent higher than that of a comparable random copolymer fraction eluting between the same temperatures, wherein said comparable random copolymer has the same comonomer(s) and has a melt index, density, and molar comonomer content (based on the whole polymer) within 10 percent of that of the LAO/α-olefin interpolymer, the LAO/α-olefin interpolymer has a weighted average blocking index, ABI, from about 0.15 to about 0.80, or the LAO/α-olefin interpolymer has a melt index ratio, $I_{10}/I_2$, from about 5 to about 35, wherein $I_2$ is the melt index measured according to ASTM D1238 Condition 190° C./2.16 kg when the LAO is ethylene and ASTM D1238 Condition 230° C./2.16 kg when the LAO is propylene, and $I_{10}$ is the melt index measured according to ASTM D1238 Condition 190° C./10 kg when the LAO is ethylene and ASTM D1238 Condition 230° C./10 kg than the LAO is propylene; the LAO/α-olefin interpolymer is an ethylene/α-olefin interpolymer (e.g., an ethylene/octene interpolymer); the LAO/α-olefin interpolymer is a propylene/α-olefin interpolymer (e.g., a propylene/butene interpolymer); the LAO/α-olefin interpolymer is a copolymer of ethylene and 1-octane, wherein the sum of the concentrations of the ethylene and 1-octane monomers is greater than 95 wt. % based on the total weight of the LAO/α-olefin interpolymer; the LAO/α-olefin interpolymer is characterized by a density from about 0.850 to about 0.895 g/cm³ (preferably from about 0.86 to about 0.89 g/cm³, more preferably from 0.865 to 0.888 g/cm³); the LAO/α-olefin interpolymer is characterized by a Shore A hardness from about 15 to about 95 (preferably from about 40 to about 90, more preferably from about 55 to about 90, and most preferably from about 70 to about 90); the LAO/α-olefin interpolymer is characterized by a melt index ratio, $I_{10}/I_2$, from about 5 to about 35 (preferably from about 5.5 to about 25, more preferably from about 6 to about 10); the LAO/α-olefin interpolymer is characterized by a melt index ratio, $I_{10}/I_2$, from about 5 to about 35 (preferably from about 5.5 to about 25, more preferably from about 6 to about 10) and/or a melt index, $I_2$, from about 0.2 to about 100 g/10 min (preferably from about 0.2 to about 40, more preferably from about 0.5 to about 10; the LAO/α-olefin interpolymer is characterized by a polydispersity index, Mw/Mn, defined by the ratio of the weight average molecular weight, Mw, and the number average molecular weight, Mn, from about 1.9 to about 7 (preferably from about 2 to about 5, and more preferably from about 2 to about 3); LAO/α-olefin interpolymer is characterized by a concentration of soft blcok(s) from about 40 to about 95 wt. % (preferably from about 50 to about 95 wt. %, and more preferably from about 60 to about 90 wt. %) based on the total weight of the LAO/α-olefin interpolymer; the LAO/α-olefin interpolymer is characterized by a weight average block index, ABI, from about 0.15 to about 0.8, (preferably from about 0.2 to about 0.7, and more preferably from about 0.4 to about 0.6); the reinforcement material includes glass fiber (e.g., glass fibers having an average length greater than about 0.5 mm, preferably greater than about 1 mm, more preferably greater than about 3 mm, and most preferably greater than about 5 mm); the reinforcement material (e.g. the glass fiber) is present at a concentration from about 5 wt. % to about 40 wt. % (preferably from about 10 to about 40 wt. %, more preferably from about 15 wt. % to about 35 wt. %, and most preferably from about 20 to about 30 wt. %, e.g., about 25 wt. %) based on the total weight of the polymeric composition; the first polymeric component is present in the amount of about 3 wt.% to about 80 wt.% (preferably from about 10 wt. % to about 70 wt. %, more preferably from about 15 wt. % to about 50 wt. %) based on the total weight of the polymeric composition; the first polymer component consists essentially of one or more polypropylenes, selected from the group consisting of polypropylene homopolymer, impact polypropylene, and random polypropylene copolymer, or any combination thereof, wherein the polypropylene has a melting temperature greater than about 125° C. (preferably greater than about 140° C.) and the random polypropylene is a copolymer of ethylene and propylene; the first polymer component consists essentially of isotactfc polypropylene homopolymer; the LAO/α-olefin interpolymer is present at a concentration from about 5 to about 90 wt. % (preferably from about 10 to about 60 wt. %, more preferably from about 20 to about 50 wt. %, and most preferably from aohut 30 to about 45 wt. %) based on the total weight of the polymeric composition; the first polymeric component is characterized by a melt flow rate from about 20 to about 500 g/10 min (preferably from about 30 to about 100, more preferably from about 50 to about 80 g/10 min) as measured according to ASTM D-1238 Condition 230° C./2.16 kg; the composition includes a polypropylene homopolymer having a melt flow rate between about 30 to about 100 g/10 min as measured according to ASTM D-1238(at 230° C., 2.16 kg), a CHARPY (notched) Impact Strength between about 2 and about 6 kJ/m² (preferably from about 2.2 to about 4.7 kJ/m²) as measured according to ISO 179-1/1eA (at 23° C.), or both; or the polymeric composition is characterized by a melt flow rate of at least about 0.5 g/10 min (preferably at least about 2 g/10 min, and more preferably at least about 5 g/10 min, arid most preferably at least about 10 g/10 min) as measured according to ASTM D-1238 Condition 230° C./2.16 kg.

Another aspect of the invention is directed at a molded article wherein the article contains a portion having a polymeric composition as described herein.

Yet another aspect of the invention is directed at a process for manufacturing a molded article wherein the molded article contains a portion having a polymeric composition as described herein, and the process includes a step of removing the article from a mold.

This aspect of the invention may be further characterized by one or any combination of the following features: the process further comprises the steps of: providing from about 3 to about 80 parts by weight (e.g., from about 3 to about 60 parts by weight) of a first material thai includes at least a portion of the hard thermoplastic, providing from about 10 to about 90 (e.g., from about 10 to about 60) parts by weight of the LAC/α-olefin interpolymer having a concentration of the second α-olefin from about 7 to about 50 mole % (preferably from about 8 to about 40 mole %, and more preferably from about 9 to about 30 mole %, and most preferably from about 10 about 20 mole %) based on the total weight of the LAO/α-olafio interpolymer, providing from about 10 to about 80 (e.g. from about 20 to about 75) parts by weight of a third material including a reinforcement concentrate having at least a portion of the at least one reinforcement material; blending the first, second and third materials to form a blend, and shaping the blend in a tool; the at least one reinforcement material includes glass fibers, the third material is an admixture including at least a portion of the at least one reinforcement material and at least a portion of the relatively hard thermoplastic which includes a polypropylene; the relatively hard thermoplastic is a polyethylene (e.g., a polyethylene having a melting temperature greater than about 125° C. such as a polyethylene homopolymer), a polyethylene copolymer (e.g., a low density polyethylene, a linear low density polyethylene, or a medium density polyethylene, such as one having a density greater than about 0.905 g/cm$^3$), a polypropylene homopolymer, a polypropylene impact copolymer, a polypropylene random copolymer, or any combination thereof; the at least one reinforcement material includes long glass fibers having an average fiber length of greater than about 5 mm; the at least one reinforcement material includes short glass fibers having an average fiber length of less than about 5 mm; the at least one relnfereernent material has an average fiber length of at least about 1 mm in the molded article; the relatively hard thermoplastic is present at a concentration from about 5 wt. % to about 70 wt. % (preferably from about 10 wt. % to about 70 wt. %, and more preferably from about 30 wt. % to about 70 wt. %) based on the total weight of the reinforcement concentrate; the at least one reinforcement material is present in a concentration from about 30 wt. % to about 90 wt. % (e.g. from about 35 wt. % to about 80 wt. %) based on the total weight of the reinforcement concentrate; the at least one reinforcement material is present in the amount of about 5 wt. % to about 40 wt. % (preferably from about 10 to about 30 wt. %, and more preferably from about 15 to about 30 wt. %) based on total weight of the molded article; the LAO/α-olefin interpolymer is present in the amount of about 10 wt. % to about 90 wt. % (e.g. from about 10 wt. % to about 60 wt. %) based on the total weight of the molded article; the process further comprises a step of melt compounding together two or more of the first material, the second material, or the third material, prior to the blending step; the process is substantially free of melt compounding any two of the first, second, and third materials prior to melting the materials in the screw of the molding machine; or the process further comprises the steps of: melhcompoundlng the first, second, and third materials to form a melt blended polymeric composition, pelletizing the melt blended polymeric composition to form pellets or granules capable of feeding in a molding machine; and placing at least 5 kg of the pellets or granules in a container.

Another processing aspect of the invention is directed at a process for compounding a polymeric composition as described herein, wherein the process comprises the steps of: melt-compounding the first polymeric component, the second polymeric component, and reinforcement material to form a melt blended polymeric composition; pelletizing the melt blended polymeric composition to form pellets or granules capable of feeding in a molding machine; and placing at least 5 kg of the pellets or granules in a container.

DETAILED DESCRIPTION OF THE INVENTION

General Definitions

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "lower-α-olefin/α-olefin interpolymer" (LAO/α-olefin interpolymer) includes "ethylene/α-olefin interpolymer" and "propylene/α-olefin interpolymer". LAO/α-olefin interpolymer generally refers to polymers comprising a first α-olefin (i.e. the lower α-olefin or "LAO") which is either ethylene or propylene and a second different α-olefin having 3 or more carbon atoms. Without limitation the LAO/α-olefin intofpolymer may preferably contain either ethylene or propylene and at lease one second different monomer selected from the group consisting of ethylene, propylene, butane, hexane, and octene. More preferably the LAO/α-olefin interpolymer is an ethylene/propylene interpolymer, an ethylene/butene interpolymer, an ethylene/octene interpolymer, a propylene/ethylene interpolymer, a propylene/butene interpolymer, or a propylene/octene interpolymer. Preferably, the first α-olefin (e.g., ethylene) comprises the majority mole fraction of the whole polymer, i.e., the LAO (e.g., ethylene) comprises at least about 50 mole percent of the whole polymer. More preferably LAO (e.g., ethylene) comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 70 mole percent, and more preferably greater than about 80 mole percent of the whole polymer and an octene content of from about 4 to about 30, preferably from about 4 to about 25, mora preferably from about 10 to about 20, and most preferably from about 15 to about 20 mole percent of the whole polymer. In some embodiments, the LAO/α-olefin interpolymer (e.g., the ethylene/α-olefin interpolymers) do not include those produced in low yields or in a minor amount or as a by-product of a chemical process. While the LAO/α-olefin interpolymers can be blended with one or more polymers, the as-produced LAO/α-olefin interpolymers are substantially pure and often comprise a major component of the reaction product of a polymerization process.

The LAO/α-olefin interpolymers comprise ethylene or propylene and one or more different copolymerizable α-olefin comonomers in polymerized form, characterized by multiple blocks or segments of two or more polymerized monomer units differing in chemical or physical properties. That is, the LAO/α-olefin interpolymers are block interpolymers, preferably multi-block interpolymers or copolymers. The terms "interpolymer" and copolymer" are used interchangeably herein. In some embodiments, the multi-block copolymer can be represented by the following formula: (AB)$_n$ (B(AB))$_n$, or A(BA)$_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows, AAA-AA-BBB-BB In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which the first α-olefin (i.e., the ethylene or the propylene) is present in an amount greater than about 95 weight percent, and preferably greater than about 98 weight percent based on the weight of the polymer. In other words, the comonomer content (content of monomers other than first α-olefin) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than the first α-olefin) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 4 weight percent to about 95 weight percent, from about 10 weight percent to about 95 weight percent, from about 20 weight percent to about 95 weight percent, torn about 40 weight percent to about 95 weight percent, from about 50 weight percent to about 95 weight percent, from about 50 weight percent to about 90 weight percent, from about 60 weight percent to about 90 weight percent, from about 65 weight percent to about 90 weight, percent, or from about 65 weight percent to about 85 weight percent of the total weight of the block interpolymer. Conversely, the hard segments can be present in similar ranges. The soft segment weight percentage and the hard segment weight percentage can be calculated based on data obtained from DSC or NMR.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic (or propylenic) functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. The multi-block copolymers may have a PDI from about 1.4 to about 10, preferably from about 10 to about 7, more preferably from about 2 to about 5, and most preferably from about 2 to about 3.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R_L$ and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent 96 percent, 97 percent, 98 percent, 99 percent, or 100 percent. Moreover, any numerical range defined by two R numbers as defined in the above is also specifically disclosed.

In general, the present invention s directed to an improved polymeric composition, processes of forming the composition as well as articles or parts formed of the polymeric composition, by the processes, or both. Advantageously, the polymeric composition can be employed to form soft-touch feel parts or components with desirable characteristics at relatively low cost, and thus finds attractive application as parts for automotive applications (e.g., automotive interior components that are subject to passenger contact). The polymeric composition typically includes at least one hard thermoplastic (e.g. a polyolefin including at least one polymer having greater than about 12% crystallinity selected from a polypropylene homopolymer, a polyethylene homopolymer, a propylene copolymer, an ethylene copolymer, and any mixture thereof) having a relatively high crystallinity, at least one soft thermoplastic (e.g., a thermoplastic having a crystaliinity and/or hardness lower than the hard thermoplastic), at least one reinforcement material (e.g., glass fibers), and optionally one or more additives that can include, without limitation, a coupling or cross-linking agent, a cross-linking coagent, a flame retardant, an ignition resistant additive, a stabilizer, a blowing agent, a blowing agent activator, a colorant, an antioxidant a mold release agent, an anti-static agent, a slip-aid (i.e., slip resistance aid), a flow enhancer, a nucleating agent, a clarifying agent, or combinations thereof or others. In one aspect of the invention, the polymeric composition may be free of one or any combination of the following: coupling-agent, cross-linking agent, or blowing agent.

It has surprisingly been shown that reinforced compositions having a desirably low hardness and/or low flexural modulus may be obtained using a lower concentration of the relatively soft thermoplastic as compared with previously used soft thermoplastics. Additionally reinforced compositions of the present invention may have surprising improvements in their low temperature properties (e.g., ductility at temperatures of about 23° C. or about −20° C.). It has unexpectedly been observed that reinforced compositions of the present invention may also have one or any combination of the following surface properties: improved gloss, improved scratch and/or mar resistance, a more rubbery soft-touch feel, high surface friction, or elimination/reduction of tiger striping. It is also observed that the compositions may also unexpectedly have desirable bulk properties, such as sound dampening properties, high stiffness, high heat distortion temperature and/or high Vicat softening temperature. These combinations of properties may allow for the reinforced compositions to be used to make a one shot molded article in applications which currently may require at least two materials (e.g., a first material for impartin good surface properties and a second material for imparting good bulk properties).

Additional teachings that may be applied in the practice of the present invention are disclosed in the concurrently filed U.S. application Ser. No. 12/256,217 filed on Oct. 22, 2008, herein incorporated by reference in its entirety. Without limitations, but by way of illustrative example, test methods for characterizing S/LEPs and test methods for characterizing propylene elastomers described in that application may be employed herein.

Turning now in greater detail to the individual components of the overall composition. The articles herein will typically include a first polymeric component that includes at least one hard thermoplastic that is relatively strong, rigid, impact resistant, or any combination thereof. For instance, the hard thermoplastic herein may be a polyolefinic thermoplastic including or consist essentially of one or more olefin homopolymers or olefin copolymers. Without limitation, the first polymeric component may consist of high density polyethylene, low density polyethylene, linear low density polyethylene, medium density polyethylene, isotactic polypropylene, impact polypropylene, random polypropylene copolymer, or any combination thereof. Preferably, the hard thermoplastic includes at least one polymer selected from a isoiaefic polypropylene (e.g., a polypropylene homopolymer), impact polypropylene, random polypropylene copolymer, or any combination thereof. Without limitation, one specific example of a preferred polypropylene homopolymer is disclosed in U.S. Pat. No. 7,087,680, incorporated by reference for all purposes.

A highly preferred first polymer component includes or consists essentially of one or more isotactic polypropylene homopolymers, although other forms of polypropylene (such as impact polypropylene, random polypropylene copolymer, atactic polypropylene, and syndiptactic polypropylene) may also be used such at low concentrations (e.g. less than about 35 wt %, or even less than about 10 wt % based on the total weight of the first polymer component. Most preferably the first polymer component is essentially free of syndiotactic polypropylene and atactic polypropylene). Suitable impact polypropylenes are impact polypropylene which are produced using a secondary copolymerization step reacting ethylene with propylene and suitable random polypropylene copolymer typically contain lass than about 5 wt. % ethylene.

The first polymeric component will typically be present in an amount of at least about 3 wt. %, preferably at least about 10 wt. %, more preferably at least about 20 wt. % and most preferably at least about 30 wt. % based on the total weight of the polymer composition. The first polymer component will typically be present in an amount of less than about 80 wt. %, preferably less than about 75 wt. %, more preferably less than about 55 wt. %, and most preferably less than about 45 wt. % (e.g., less than about 40 wt. %) based on the total weight of the polymer composition.

As gleaned from this discussion, a portion of the first polymeric component, the second polymeric component, or both includes a portion of the material that is crystalline. Preferably, a portion (e.g., at least 30 wt. %, preferably at least about 50 wt. %, more preferably at least about 70 wt. %, and most preferably at least about 95 wt. %, or even all) of the first polymeric component has a relatively high crystalline, a portion (e.g., at least 30 wt. %, preferably at least about 50 wt. , more preferably at least about 70 wt. %, and most preferably at least about 95 wt. %, or even all) of the second polymeric component has a relatively low crystalline, or both The crystalllnlty (e.g., the average crystallinity) of the first polymeric component may be greater than about 16 wt % , preferably greater than about 31 wt %, more preferably greater than about 36 wt %, and most preferably greater than about 41 wt % (e.g., greater than about 45 wt. %). The cfystailinity of the second polymeric component, the soft thermoplastic, or both may be less than the first polymer component. For example, the second polymeric component, the soft thermoplastic or both may have a crystallinlty (e.g., an average crystallinity) less than about 44 wt %, preferably less than about 40 wt %, more preferably less than about 35 wt %, and most preferably less than about 30 wt. % (e.g., less than about 15 wt. %). The second polymer component may have a crystalliinity greater than about 2%, preferably greater than about 3%, more preferably greater than about 5%, and most preferably greater than about 7% (e.g., greater than about 10%) by weight. For example, the second polymer component, the soft thermoplastic, or both may have a crystallinity from about 2% to about 44%, preferably from about 2% to about 40%, more preferably from about 5% to about 35% and most preferably from about 5% to about 30% (e.g., from about 7% to about 15%) by weight.

Percent crystallinity herein can be measured by differential scanning calorlmetry, according to ASTM D 3418.03 or ISO 11357-3. By way of example, a milligram size sample of polymer is sealed into an aluminum DSC pan. The sample is placed into a DSC cell with a 25 cubic centimeter per minute nitrogen purge and cooled to −100C. A standard thermal history is established for the sample by heating at 10° C./minute to 225° C. The sample is then cooled (at 10° C./minute) to −100° C. and reheated at 10° C./minute to 225° C. The observed heat of fusion for the second scan is recorded ($\Delta H_{observed}$). The observed heat of fusion is related to the degree of crystallinity in weight percent based on the weight of the sample by the following equation:

$$\% \text{ Crystallinity} = \frac{\Delta H_{observed}}{\Delta H_{known}} \times 100,$$

where the value for $\Delta H_{known}$ is a literature reported established reference value for the polymer. For example, heat of fusion for isotactic polypropylene has been reported in B. Wunderlich, Macromolecular Physics, Volume 3, Crystal Melting, Academic Press, New York, 1980, p. 48, is $\Delta H_{known}$=165 Joules per gram of polypropylene polymer; and the heat of fusion for polyethylene has been reported in F. Rodriguez, Principles of Polymer Systems, $2^{nd}$ Edition, Hemisphere Publishing Corporation, Washington, 1982, p.

54, is $\Delta H_{known}$=287 Joules per gram of polyethylene polymer. The value of $\Delta H_{known}$=165 J/g may be used for polymers containing greater than about 50 mole % propylene monomer and the value of $\Delta H_{known}$=287 J/g may be used for polymers containing greater than about 50 mole % ethylene monomers.

The molecular weight and hence the melt flow rate of the hard thermoplastic (e.g. the polypropylene) for use in the present invention may vary depending upon the application. In one preferred embodiment, the melt flow rate for the polypropylene useful herein is generally from about 0.1 grams/10 minutes (g/10 min) to about 100 g/10 min, preferably from about 0.5 g/10 min to about 80 g/10 min, more preferably from about 3 to about 60 g/10 min, and most preferably from about 5 g/10 min to about 30 g/10 min measured according to ISO 1133 tested at 230° C. with a load of 2.16 kg.

As indicated, it is likely that the first polymeric component will be important for helping to impart rigidity, strength, and possibly even impact resistance to the overall resulting composition. Accordingly, the material selected desirably will exhibit attractive impact resistance. For example, the CHARPY (notched) impact strength (at 23° C.) for the thermoplastic polymer (e.g. the polypropylene) useful herein may be greater than about 0.8 kJ/m², preferably greater than about 1kJ/m², more preferably greater than about 1.6 kJ/m², and most preferably greater than about 2 kJ/m² (e.g. greater than about 2.3 kJ/m², or even greater than about 4 kJ/m²) as measured according to ISO 179-1/1eA. Suitable thermoplastic polymers (e.g. suitable polypropylenes) may be also be characterized by a CHARPY (notched) impact strength (at 23° C.) for the polypropylene less than about 15 kJ/m², preferably less than about 12 kJ/m², more preferably less than about 8 kJ/m², and most preferably less than about 6 kJ/m² (e.g. less than about 5 kJ/m²) as measured according to ISO 179-1/1eA at 23° C.

In one preferred aspect of the invention, the thermoplastic polymer includes a polypropylene homopolymer having a melt flow rate from about 1 to about 5 g/10 min as measured according to ISO 1133 (at 230° C., 2.16 kg) and a CHARPY (notched) Impact Strength from about 3 to about 8 kJ/m² as measured according to ISO 179-1/1eA (at 23° C.). In a second preferred aspect of the invention the thermoplastic polymer includes a polypropylene homopolymer having a melt flow rate from about 40 to about 60 g/10 min (e.g., from about 50 to about 55 g/10 min) as measured according to ISO 1133 (at 230° C., 2.16 kg) and a CHARPY (notched) Impact Strength from about 1 to about 5 kJ/m² as measured according to ISO 179-1/1 eA (at 23° C.). In a third preferred aspect of the invention the thermoplastic polymer includes a polypropylene impact copolymer having a melt flow rate from about 30 to about 55 g/10 min (e.g., from about 37 to about 47 g/10 min) as measured according to ISO 1133 (at 230° C., 2.16 kg) and a CHARPY (notched) Impact Strength from about 4 to about 12 kJ/m² (e.g., from about 5 to about 8 kJ/m²) as measured according to ISO 179-1/1eA (at 23° C.).

It is appreciated that the first polymeric component (e.g., the one or more hard thermoplastics) useful herein may exhibit a Flexural Modulus as measured according to ISO 178 that typically ranges from about 1400 to about 1800 MPa, and more specifically from about 1500 to about 1700 MPa; a Tensile Strength at Yield according to ISO 527-2 that typically ranges from about 20 to about 50 MPa, and more specifically from about 30 to about 40 MPa; a Tensile Elongation at Yield according to ISO 527-2 that ranges from about 5 to about 20%, more specifically from about 7 to about 15%, or any combination thereof. In one highly preferred embodiment, the first polymeric component includes a propylene polymer, preferably a polypropylene homopolymer, and most preferably an isotactic polypropylene (e.g., an isotactic polypropylene which contains less than about 5 wt % atactic polypropylene). Although, it may nonetheless include a random copolymer or even an impact copolymer (which already contains a rubber phase). Examples of particularly preferred polypropylene homopolymrs for use herein include one or both H705-03 or H734-52, available from The Dow Chemical Company or others having similar characteristics. Examples of particularly preferred polypropylene impact copolymers for use herein include C705-44NA, available from The Dow Chemical Company or others having similar characteristics.

Second Polymeric Component

The second polymeric component is characterized in being softer (e.g., low Shore A durometer), more flexible (e.g., lower flexural modulus), or lower crystallinity than the hard first polymeric component The second polymeric component typically includes one or more soft thermoplastics. Suitable soft thermoplastics include an olefinic block copolymer (e.g., an ethylene/α-olefin interpolymer), a substantially linear or linear ethylene polymer ("S/LEP"), a polypropylene elastomer, or any combination thereof. Preferably the second polymer component includes or consists essentially of an ethylene/α-olefin interpolymer.

Olefinic block polymer/ethylene/α-olefin interpolymer

In one aspect of the invention, the second polymeric component may include an multi-block polymer having a plurality of blocks, including a hard block having a relatively high crystallinity and a soft block having a crystallinity lower than the hard block. The multi-block polymer (e.g., the multi-block olefenic polymer) may be a homopolymer including essentially one (e.g., one) α-olefin monomer or copolymer including two α-olefin monomers a terpolymer including three or more monomers (which typically contain at least two monomers that are olefins and may even contain three α-olefins) or may contain four or more of α-olefin monomers. A multi-block homopolymer may contain hard and soft blocks having the same monomer, the differences in the blocks being the regularity of the monomers (e.g., the hard block may have monomers which are more regularly oriented than the soft block, so that the hard block has a higher crystallinity). An olefinlc block copolymer may contain blocks having different concentrations of monomers. For example, an olefinic block copolymer may have one or more hard blocks which contains a high concentration (e.g., greater than about 80 wt. %, preferably greater than about 90 wt. %, more preferably greater than about 95 wt. %, and most preferably greater than about 99 wt. %, or even 100 wt. % of the olefinlc block copolymer) of a first α-olefinic monomer and a low concentration of a second α-olefin monomer and one or more soft blocks which contain a concentration of the first α-olefin which is lower than the in the one or more hard blocks. Without limitation, the olefinic block copolymer may be an ethylene/α-olefin interpolymer. Examples of ethylene/α-olefin interpolymer which may be used in the second polymeric component are described in PCT international Patent Publication Nos. WO2006/102155A2 (filed Mar. 15, 2006), WO2006/101966A1 (filed Mar. 15, 2006), WO2006101932A2 (filed Mar. 15, 2006), and WO2006102155A2 (filed Mar. 15, 2006), all of which are expressly incorporated herein by reference in there entirety.

Ethylene/α-Olefin Interpolymers

Ethylene/α-olefin interpolymers suitable for use in the second polymeric component include ethylene and one or more copolymerizable α-olefin comonomers in polymerized form, characterized by multiple blocks or segments of two or more polymerized monomer units differing in chemical or physical properties (block interpolymer), preferably a multi-block copolymer.

Suitable ethylene/α-olefin interpolymers block interpolymers may have a molecular fraction which elutes between 40° C. and 130° C., whan fractionated using TREF increments, characterized in that every fraction that has an ATREF elutlon temperature between 40° C. and less than about 76° C., has a melt enthalpy (heat of fusion) as measured by DSC, corresponding to the equation: Heat of fusion (J/gm)≤(1.1312) (ATREF elutlon temperature in Celsius)+22.97.

Average Block Index

Suitable ethylene/α-olefin interpolymer may be characterized by an average block index, ABI, which is greater than zero and up to about 1.0 and a molecular weight distribution, Mw/Mn, greater than about 1.3. The average block index, ABI, is the weight average of the block index ("BI") for each of the polymer fractions obtained in preparative TREF from 20° C. and 110° C., with an increment of 5° C.: ABI=$\Sigma w_i BI_j$) where $BI_j$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI=[(1/T_X)-(1/T_{XO})]/[(1/T_A)-(1/T_{AB})], \text{ or}$$

$$BI=-[LnP_X-LnP_{XO}]/[LnP_A-LnP_{AB}]$$

where $T_X$ is the preparative ATREF elution temperature for the ith fraction (preferably expressed in Kelvin), $P_X$ is the ethylene mole fraction for the which fraction, which can be measured by NMR or IR as describe below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372.degree. K., $P_A$ is 1.

$T_{AB}$ is the ATREF temperature for a random copolymer of the same composition and having an ethylene mole fraction of $P_{AB}$ $T_{AB}$ can be calculated from the following equation: $LnP_{AB}=\alpha/T_{AB}+\beta$ where α and β are two constants which can be determined by calibration using a number of known random ethylene copolymers. It should be noted that a and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$LnP=-237.83/T_{ATREF}+0.639$$

$T_{XO}$ is the ATREF temperature for a random copolymer of the same composition and having an ethylene mole fraction of $P_X$. $T_{XO}$ can be calculated from $LnP_X=\alpha/T_X+\beta$. Conversely, $P_{XO}$ is the ethylene mole fraction for a random copolymer of the same composition and having an ATREF temperature of $T_X$, which can be calculated from $LnP_X=\alpha/T_{XO}+\beta$.

Once the block index (BI) for each preparative TREF fraction is obtained, the weight average block index, ABI, for the whole polymer can be calculated. In one class of suitable ethylene/α-olefin interpolymers, ABI may be greater than zero but less than about 0.15 or from about 0.1 to about 0.3. In another class of suitable ethylene/α-olefin interpolymers, ABI may be greater than about 0.15, preferably greater than about 0.2, more preferably greater than about 0.3 and most preferably greater than about 0.4. Such materials may also be characterized by an ABI less than about 0.9, preferably less than about 0.8, more preferably less than about 0.7 and most preferably less than about 0.6.

ATREF Peak Comonomer Composition Measurement by Infra-Red Detector

The comonomer composition of the TREF peak can be measured using an IR4 infra-red detector available from Polymer Char, Valencia, Spain (http:/www.polymerchar.com).

The "composition mode" of the detector is equipped with a measurement sensor ($CH_2$) and composition sensor ($CH_3$) that are fixed narrow band infra-red filters in the region of 2800-3000 cm.sup.-1. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHW) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100; and Deslauriers, P. J.; Rohlfing, D. C.; Shieh, E. T.; "Quantifying short chain branching miorostrcetures in ethylene-1-olefin copolymers using size exclusion chromatography and Fourier transform infrared spectroscopy (SEC-FTIR)", Polymer (2002), 43, 59-170, both of which are incorporated by reference herein in their entirety.

Relationship between Melting Point and Density

LAO/α-olefin Interpolymers (e.g., ethylene/α-olefin interpolymers) suitable for use in the polymeric composition of the invention may be characterized by a melting point, Tm, which is higher than the melting point of a random copolymer having the same density, d. For example, the LAO/α-olefin interpolymers (e.g., the ethylene/α-olefin interpolymers) may have at least one melting point, Tm, in degrees Celsius and density, d, in grams/cubic centimeter, wherein the numerical values of the variables correspond to the relationship: $Tm \geq 1000(d)-790$, and preferably $Tm > -2002.9+4538(d)-2422.2(d)^2$, more preferably $Tm \geq 6288.1+13141(d)-6720.3(d)^2$, and most preferably $Tm \geq 858.91-1825.3(d)+1112.8(d)^2$.

Preferably, the LAO/α-olefin interpolymers (e.g., the ethylene/α-olefin interpolymers) suitable for use in the polymeric composition of the invention have a Mw/Mn from about 1.7 to about 3.5 and at least one melting point, Tm, in degrees Celsius and density, d, in grams/cubic centimeter, wherein $d \leq 0.900$, and the numerical values of the variables correspond to the relationship: $Tm \geq 1000(d)-790$, and preferably $Tm > -2002.9+4538.5(d)-2422.2(d)^2$, more preferably $Tm \geq 6288.1+13141(d)-6720.3(d)^2$, and most preferably $Tm \geq 858.91-1825.3(d)+1112.8(d)^2$.

Relationship Between the Heat of Fusion and the Difference Between the Tallest DSC Peak and the Tallest CRYSTAF Peak Suitable LAO/α-olefin interpolymers (e.g., suitable ethylene/α-olefin interpolymers) may be characterized by a difference between the tallest Differential Scanning Calorimatry ("DSC") peak minus the temperature of the tallest Crystallization Analysis Fractionation ("CRYSTAF") peak which is higher than for a random copolymer having the same heat of fusion. For example, suitable LAO/α-olefin interpolymers (e.g., ethylene/α-olefin interpolymers) may comprise, in polymerized form, ethylene or propylene and one or more different α-olefins and are characterized by a $\Delta T$, in degree Celsius, defined as the temperature for the tallest DSC peak minus the temperature for the tallest CRYSTAF peak and a heat of fusion in J/g, $\Delta H$, and $\Delta T$ and $\Delta H$ which may satisfy the following relationships: $\Delta T \geq -0.1299(\Delta H)+62,81$, and preferably $\Delta T \geq 0.1299(\Delta H)+64.38$, and more preferably $\Delta T \geq -0.1299(\Delta H) +65.95$, for $\Delta H$ up fo 130 J/g. Moreover, $\Delta T$ may be equal to or greater than 48° C. for $\Delta H$ greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and $\Delta H$ is the numerical value of the heat of fusion in J/g. More preferably, the highest CRYSTAF peak contains at least 10 percent of the cumulative polymer.

Relationship Between the Elastic Recovery and the Density

Suitable LAO/α-olefin interpolymers (e.g., suitable ethylene/α-olefin interpolymers) may have an elastic recovery, Re, in percent at 300 percent strain and 1 cycle measured on a compression-molded film of the interpolymer which is higher than the elastic recovery of a random copolymer having the same density. For example, suitable LAO/α-olefin interpolymers (e.g., ethylene/α-olefin interpolymers) may be characterized by an elastic recovery, Re, and a density, d, in g/cm³, wherein the numerical values of Re and d may satisfy the following relationship when the interpolymer is substantially free of a cross-linked phase: $Re > 1481-1629(d)$; and preferably $Re \geq 1491-1629(d)$: and more preferably $Re \geq 1501-1629(d)$; and even more preferably $Re \geq 1511-1629(d)$.

Molar Comonomer Concentration of TREF Fractions

Suitable LAO/α-olefin interpolymers (e.g., suitable ethylene/α-olefin interpolymers) when fractionated using Temperature Rising Button Fractionation ("TREF"), may have at least fraction which has a relatively high molar comonomer concentration, (i.e., the interpolymer may have a molar comonomer concentration which is higher than for fraction of a compositionally similar random copolymer which is eluted at the same temperature). For example, the LAO/α-olefin interpolymers (e.g., the ethylene/α-olefin interpolymers) may have a molecular fraction which elutes between 40° C. and 130° C. when fractionated using TREF, which may be characterized in that said fraction has a molar comonomer content higher, preferably at least 5 percent higher, more preferably at least 10, 15, 20 or 25 percent higher, than that of a comparable random ethylene interpolymer fraction elutiog between the same temperatures, wherein said comparable random copolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable copolymer is also within 10 percent of that of the blocked interpolymer and/or the comparable copolymer has a total comonomer content within 10 weight percent of that of the blocked interpolymer.

Comonomers and Concentration

The LAO/α-olefin interpolymers (e.g., the ethylene/α-olefin interpolymers) used in the polymer compositions of the invention are preferably interpolymers of ethylene or propylene with at least one different $C_3$-$C_{20}$ α-olefin. Copolymers of ethylene and a $C_3$-$C_{12}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include C.sub.3-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_2$-$C_{20}$ aliphatic and aromatic compounds containing vinylic unsaturation, as well as cyclic compounds, such as cyclobutene, eyclopentene, dicyclopentadiene, and norbornene, including but not limited to, norbonene substituted in the 5 and 6 position with $C_1$-$C_{20}$ hydrocarbyl or cyclobydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butane, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctane, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butane, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidiene aromatic monomers including styrene, α-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadlene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cyctoalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPOMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

The LAO/α-olefin interpolymers (e.g., the ethylene/α-olefin interpolymers) may be an interpolymer including an first α-olefin (either ethylene or propylene) and a second different α-olefin (e.g., butane, or octane) having a second α-olefin concentration (e.g., a butene concentration, or an octane concentration) greater than about 6 mole %, preferably greater than about 8 mole %, more preferably greater than about 9 mole %, and most preferably greater than about 10 mole % based on the monomers of the interpolymer. The interpolymer may have a second α-olefin concentration (e.g., an octane concentration, or a butane concentration) less than about 40 mole %, preferably less than about 30 mole %, mom preferably less than about 25 mole %, and most preferably less than about 20 mole % based on the monomers of the interpolymer.

The LAO/α-olefin interpolymers (e.g., the ethylene/α-olefin interpolymers) may be an interpolymer including an first α-olefin (either ethylene or propylene) and a second different α-olefin (e.g., butane, or octane) having a first α-olefin concentration (e.g., an ethylene concentration, or a propylene concentration) greater than about 20 wt. %, preferably greater than about 40 wt. %, more preferably greater than about 60 wt., %, and most preferably greater than about 70 wt. % based on the total weight of the interpolymer. The interpolymer may have a first α-olefin concentration (e.g., an ethylene concentration, or a propylene concentration) less than about 95 wt. %, preferably less thm about 90 wt. %, more preferably less than about 85 wt. %, and most preferably less than about 80 wt. % based on the total weight of the interpolymer.

The LAO/α-olefin interpolymers (e.g., ethylene/α-olefin interpolymers) may be an interpolymer including an ethylene or a propylene and a second different α-olefin (e.g., butene, or octene) wherein the total concentration of the ethylene or propylene and second α-olefin is greater than about 90 wt. %, preferably greater than about 95 wt. %, more preferably greater than about 98 wt. %, and most preferably greater than about 99 wt. % (e.g., about 100 wt. %) based on the total weight of the interpolymer.

Density

Suitable LAO/α-olefin interpolymers (e.g., ethylene/α-olefin interpolymers) may be characterized by a density greater than about 0.850, preferably greater than about 0.855, more preferably greater than about 0.860, and most preferably greater than about 0.885 g/cm$^3$. Suitable ethylene/α-olefin interpolymers may be characterized by a density less than about 0.900, preferably less than about 0.895, more preferably less than about 0.890, and most preferably less than about 0.888 g/cm$^3$.

Hardness

The LAO/α-olefin interpolymers (e.g., the ethylene/α-olefin interpolymers) may be characterized by a Shore A hardness greater than about 15, preferably greater than about 40, more preferably greater than about 55, and most preferably greater than about 70. The ethylene/α-olefin interpolymer may be characterized by a Shore A hardness less than about 95, preferably less than about 90, and more preferably less than about 85. For example, the Shore A hardness may be from about 15 to about 95, preferably from about 40 to about 90, even more preferably from about 70 to about 90.

Melt Index ratio

The LAO/α-olefin interpolymers (e.g., the ethylene/α-olefin interpolymers) may be characterized by a melt index ratio, $I_{10}/I_2$, greater than about 5, preferably greater than about 5.5, more preferably greater than about 6, and most preferably greater than about 6,3. The LAO/α-olefn interpolymers (e.g., the ethylene/α-olefin interpolymers) may be characterized by a melt index ratio, $I_{10}/I_2$, less than about 35, preferably lass than about 25, more preferably less than about 14, and most preferably less than about 10.

Melt Index

The LAO/α-olefin interpolymers (e.g., the ethylene/α-olefin interpolymers)r may be characterized by a melt index, $I_2$, greater than about 0.2, preferably greater than about 0.5, and most preferably at least about 1. The LAO/α-olefin interpolymers (e.g., the ethylene/α-olefin interpolymers) may be characterized by a melt index, $I_2$, less than about 40, preferably less than about 20, and most preferably less than about 10.

Polydispersity Index

The LAO/α-olefin interpolymers (e.g., the ethylene/α-olefin interpolymers) may be characterized by a polydispersity index, Mw/Mn, defined by the ratio of the weight average molecular weight, Mw, and the number average molecular weight, Mn, greater than about 1.7, preferably greater than about 1.9, more preferably at least about 2. The LAO/α-olefin interpolymers (e.g., the ethylene/α-olefin interpolymers) may be characterized by a polydispersity index less than about 7, preferably less than about 5, more preferably less than about 3.5 and most preferably less than about 3.

Sot Blocks

The LAO/α-olefin interpolymers (e.g., the ethylene/α-olefin interpolymers) may be characterized by a concentration of soft hlockCs) from about 40 to about 95 wt. % (preferably from about 50 to about 95 wt. %, and more preferably from about 60 to about 90 wt. %) based on the total weight of the interpolymer.

Test Methods for the LAO/α-Olefin Interpolymers

Standard CRYSTAF Method

Branching distributions (e.g., comonomer distributions) may determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method

Differential Scanning Calorimetry analysis of the ethylene/α-olefin interpolymer may be determined using a TAI model Q1000 DSC equipped with an RCS cooling accessory and an autosampler. A nitrogen purge gas flew of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C.and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci. Polym. Let. 6, 621 (1968)): $M_{polyethylene} = 0.4316(M_{polysytrene})$.

Polyethylene equivalent molecular weight calculations may be performed using Viscotek TriSEC software Version 3.0.

Density

Samples for density measurement may be prepared according to ASTM D 1928. Measurements are made within one hour of sample pressing using ASTM D792, Method B.

Flexural/Secant Modulus/Storage Modulus

Samples are compression molded using ASTM D1928. Flexural and 2 percent secant moduli are measured according to ASTM D-790. Storage modulus is measured according to ASTM D 5026-01 or equivalent technique.

Mechanical Properties—Tensile, Hysteresis, and Tear

Stress-strain behavior in uniaxial tension may be measured using ASTM D 1708 micro-tensile specimens. Samples are stretched with an Instron at 500% min.sup.-1 at 21° C. Tensile strength and elongation at break are reported from an average of 5 specimens.

100% and 300% Hysteresis may be determined from cyclic loading to 100% and 300% strains using ASTM D 1708 microtensile specimens with an Instruct instrument. The sample is loaded and unloaded at 267% min$^{-1}$ for 3 cycles at 21° C. Cyclic experiments at 300% and 80° C. are conducted using en environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery, Re, is defined as:

$$Re = 100 \times (\epsilon_f - \epsilon_s)/\epsilon_f$$

where $\epsilon_f$ is the strain taken for cyclic loading and $\epsilon_s$ is the strain where the load returns to the baseline during the 1$^{st}$ unloading cycle.

Melt Index

When the LAO/α-oleftn interpolymer is an ethylene/α-olefin interpolymer, $I_2$, is measured in accordance with ASTM D 1238, Condition 190° C./2.16 kg and $I_{10}$ is also measured in accordance with ASTM D 1238, Condition 190° C./10 kg. When the LAO/α-olefin interpolymer is an propylene/α-olefin interpolymer, $I_2$, is measured in accordance with ASTM D 1238, Condition 230° C./2.16 kg and $I_{10}$ is also measured in accordance with ASTM D 1238, Condition 230° C./10 kg.

ATREF

Analytical temperature rising eiutlon fractionation (ATREF) analysis is conducted according to the method described in U.S. Pat. No. 4,798,081 and Wilde, L.; Ryle, T. R.; Knobeloch, D. C.; Peat, I. R.; Determination of Branching Distributions in Polyethylene and Ethylene Copolymers, J. Polym. Sci., 20, 441-455 (1982), which are incorporated by reference herein in their entirety. The composition to be analyzed is dissolved in tirichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The MMR samples may be prepared by adding approximately 3 g of a 50/50 mixture of tetrachloroethane-d,sup.2/orthodichlorobenzene to 0.4 g sample in a 10 mm NMR tuoe. The samples are dissolved and homogenized by heating the tube and its contents to 150° C. The data are collected using a JEOL Eclipse™ 400 MHz spectrometer or a Vanan Unity Plus™ 400 MHz spectrometer, corresponding to a .sup.13C resonance frequency of 100.5 MHz. The data are acquired using 4000 transients per data file wild a 6 second pulse repetition delay. To achieve minimum signal-to-noise for quantitative analysis, multiple data flies are added together. The spectral width is 25,000 Hz with a minimum file state of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation may be earned by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm.times.12 cm) steel column packed with a 60:40 (v:v) mm of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160°C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

The second polymeric component (which may comprise or consist of one or more LAO/α-olefin interpolymers, such as ethylene/α-olefin interpolymers or a propylene/α-olefin interpolymers) may be present in the polymer composition at a concentration greater than about 10 wt. %, preferably greater than about 15 wt. %, more preferably greater than about 20 wt. %, and most preferably greater than about 25 wt. % (e.g., greater than about 35 wt. %) based on the total concentration of the first polymeric component and the second polymeric component. The second polymer component (e.g., the ethylene/α-olefin interpolymer, or the propylene/α-olefin interpolymer) may be present in the polymer composition at a concentration less than about 70 wt. %, preferably less than about 60 wt. %, more preferably less than about 55 wt. %, and most preferably less than about 50 wt. % (e.g., even less than about 45 wt. %) based on the total concentration of the first polymeric component and the second polymeric component.

Propylene Containing Elastomer

The second polymeric component may also include or consist essentially of a polypropylene elastomer. Suitable polypropylene elastomers may contain propylene monomer at a concentration greater than about 50 wt. %, preferably greater than about 65 wt. %, more preferably greater than about 70 wt. %, and most preferably greater than about 80 wt. % (e.g., at least 85 wt. %) based on the weight of the polypropylene elastomer. The polypropylene elastomer may also contain one or more additional $C_{2-12}$ α-olefin comonomers (e.g., a comonomer including ethylene, or consisting of ethylene, or including butene, or consisting of butene) at a concentration greater than about 5 wt. %, preferably greater than about 7 wt. %, more preferably greater than about 9 wt. %, and most preferably greater than about 12 wt. % based on the total weight of the polypropylene elastomer. For example, the comonomer content may range from about 5 to about 40 percent by weight of the polypropylene elastomer composition, more preferably from about 7 to about 30 percent by weight of the polypropylene elastomer composition, and still more preferably from about 9 to about 15 percent by weight of the polypropylene elastomer composition. The polypropylene elastomer may have some crysfaiiioify or may be amorphous. Suitable polypropylene elastomers may have a peak melting temperature less than about 130° C. preferably less than about 115° C., and most preferably less than about 100° C., as measured by differential scanning calorimetry at a heating rate of about 10° C./minn on a sample which has been cooled from about 220° C. to about 0° C. at a rate of about 10° C./min.

The propylene elastomer preferably contains an α-olefin selected from ethylene, butene, hexene, and octane. More preferably the propylene elastomer contains an α-olefin selected from ethylene, butene, and octane. Most preferably the propylene elastomer contains an α-olefin selected from ethylene and butene.

The polypropylene elastomer may exhibit a Shore A hardness (i.e., durometer) as measured according to ASTM D 2240-05 of at least about 40, more preferably at least about 50, still more preferably at least about 65. The Shore A hardness may also be less than about 97, preferably less than about 95, more preferably less than about 92, still more preferably less than about 85 (e.g., less than about 80). For example, the polypropylene elastomer may have a Shore A hardness from about 40 to about 97, more preferably from about 50 to about 95, and still more preferably from about 65 to about 95 Shore A.

Suitable polypropylene elastomer may have a melt flow rate as measured according to ASTM D1238 at 230° C./2.16 kg of at least 1, preferably at least about 4, more preferably at least about 7, and most preferably at least about 10 g/10 min. Without limitation, the propylene elastomers suitable for the polymeric composition may have a melt flow rate of less than about 1500, preferably less than about 150, more preferably less than about 100, and most preferably less than about 60 g/10 min.

It is preferred that the polypropylene elastomer exhibit at least some crystallinity The crystallinity may be at least about 2, preferably at least about 5, and still more preferably at least about 7 percent by weight of the polypropylene elastomer material. Without limitation, suitable polypropylene elastomers may have a crystaiiinity less than about 50 wt. % For example, the crystallinity of the propylene elastomer may be less about 40, preferably less than about 35, more preferably less than about 28, and still more preferably less than about 20 percent by weight of the polypropylene elastomer material, in general, suitable propylene elastomer may have a crystallinity from about 2 wt. % to about 50 wt. %. For example, the crystallinity may range from about 2 to about 40, more preferably from about 5 to about 35, and still more preferably about 7 to about 20 percent by weight of the polypropylene elastomer material.

If the propylene elastomer is a copolymer of propylene and ethylene (i.e., the comonomer is ethylene) then it will be appreciated from the above that the resulting preferred overall compositions (i.e., the polymeric composition) which include a propylene elastomer will therefore have an ethylene content (i.e., a total ethylene content). For example, in one aspect the overall ethylene content in the final resulting composition may be greater than about 2 percent by weight of the overall resulting composition, preferably greater than about 3 percent by weight of the overall resulting composition, and more preferably greater than about 4 percent by weight of the overall resulting composition. In this aspect of the invention, it is generally expected however the total concentration of ethylene in the overall resulting composition will be less than about 35 percent by weight of the overall composition, preferably less than about 25 percent by weight of the overall composition, more preferably less than about 20percent by weight of the overall composition, and still more preferably less than about 10 percent by weight of the overall resulting composition.

If the propylene elastomer is a copolymer of propylene and a $C_4$-$C_{12}$ α-olefin (e.g., butane, hexane, or octane), then it will be appreciated from the above that the resulting preferred overall compositions (i.e., the polymeric composition) which include a propylene elastomer will therefore have a total $C_4$-$C_{12}$ α-olefin, for example, in one aspect the overall $C_4$-$C_{12}$ α-olein content in the final resulting composition may be greater than about 2 percent by weight of the overall resulting composition, preferably greater than about 3 percent by weight of the overall resulting composition, and more preferably greater than about 4 percent by weight of the overall resulting composition. In this aspect of the invention, it is generally expected however that the total concentration of $C_4$-$C_{12}$ α-olefin in the overall resulting composition will be less than about 35 percent by weight of the overall composition, preferably less than about 25 percent by weight of the overall composition, more preferably less than about 20 percent by weight of the overall composition, and still more preferably less than about 10 percent by weight of the overall resulting composition.

Other examples of suitable elastomers which may be used in the second polymeric component include elasfomeric polymers containing greater than about 50 wt. % (e.g., greater than 60 wt. %) propylene monomer and greater than about 5 wt. % ethylene monomer and may be characterized by a peak melting temperature from about 35° C. to about 130° C. (e.g. from about 40° C. to about 110° C.) as measured by differential scanning calorirnstry. Such elastomers are commercially available from THE DOW CHEMICAL COMPANY under the designation of VERSIFY® (e.g., including 2400, 3000, 3200, 3300, 3401, and 4301) and from EXXONMOBIL CHEMICAL COMPANY under the designation of VISTAMAXX®.

Additional specific examples of propylene elastomers that may be employed in accordance with the present teachings include those disclosed in WO 03/040201 A1 filed on May 6, 2002, published US Application No. 2003-0204017 filed on May 5, 2002, and U.S. Pat. No. 6,525,137 issued on Feb. 25, 2003, all of which are incorporated in their entirety by reference.

For example, the propylene elastomer may include a Low Elasticity Ethylene-Propylene Copolymer (LEEP Copolymer) as described in U.S. Pat. No. 6,525,157. Suitable LEEP Copolymer may contain from a lower limit of 5% or 6% or 8% or 10% by weight to an upper limit of 20% or 25% by weight ethylene-derived units, and from a lower limit of 75% or 80% by weighl to an upper limit of 95% or 94% or 92% or 90% by weight propylene-derived units, the percentages by weight based on the total weight of propylene- and ethylene-derived units. The copolymer is substantially free of diene-derived units.

In various embodiments, features of the LEEP Copolymers include some or all of the following characteristics, where ranges from any recited upper limit to any recited lower limit ere contemplated:

(i) a melting point ranging from an nppar limit of less than 110° C., or less than 90° C., or less than 80° C., or less than 70° C., to a lower limit ol greater than 25° C., or greater than 35° C., or greater than 40° C., or greater than 45° C.;

(ii) a relationship of elasticity to 500% tensile modulus such that Elasticity≤0.935M+12, or Elasticity≤0.935M+6, or Elasticity≤0.935M, where elasticity is in percent and M is the 500% tensile modulus in mega Pascal (MPa);

(iii) a relationship of flexural modulus to 500% tensile modulus such that Flexural Modulus≤$4.2e^{0.27M}$+50, or Flexural Modulus≤$42e^{0.27M}$ +, or Flexural Modulus≤$4.2e^{0.27M}$+ 10, or Flexural Modulus≤$4.2e^{0.27M}$+2, where flexural modulus is in MPa and M is the 500% tensile modulus in MPa;

(iv) a heat of fusion ranging from a lower limit of greater than 1.0 Joule per gram (J/g), or greater than 1.5 J/g, or greater than 4.0 J/g, or greater than 6.0 J/g, or greater than 7.0 J/g, to an upper limit of less than 125 J/g, or less than 100 J/g, or less than 75 J/g, or less than 60 J/g, or less than 50 J/g, or less than 40 J/g, or less than 30 J/g;

(v) a triad tacticity as determined by carbon-13 nuclear magnetic resonance ($^{13}$C NMR) of greater than 75%, or greater than 80%, or greater than 85%, or greater than 90%;

(vi) a tacticity index m/r ranging from a lower limit of 4 or 6 to an upper limit of 8 or 10 or 12;

(vii) a proportion of inversely inserted propylene units based on 2.1 insertion of propylene monomer in all propylene insertions, as measured by $^{13}$C NMR of greater than 0.5% or greater than 0.6%;

(viii) a proportion of inversely inserted propylene units based on 1.3 insertion of propylene monomer in all propylene insertions, as measured by $^{13}$C NMR, of greater than 0.05%, or greater than 0.06%, or greater than 0.07%, or greater man 0.08%, or greater than 0.085%;

(ix) an intermolecular tacticity such that at least X % by weight of the copolymer is soluble in two adjacent temperature fractions of a thermal fractionation carried out in hexane in 8° C. increments, where X is 75, or 80, or 85, or 90, or 95, or 97, or 99;

(x) a reactivity ratio product $r_1 r_2$ of less than 1.5, or less than 1.3, or less than 1.0, or less than 0.8;

(xi) a molecular weight distribution Mw/Mn ranging from a lower limit of 1.5 or 1.6 to an upper limit of 40 or 20 or 10 or 5 or 3;

(xii) a molecular weight of from: 15,000-5,000,000;

(xiii) a sold stale proton nuclear magnetic resonance ($^1$H NMR) relaxation time of less than 18 milliseconds (ms), or less than 18 ms, or less than 14 ms, or less than 12 ms, or less than 10 ms;

(xiv) an elasticity as defined herein of less than 30%, or less than 20%, or less than 10%, or less than 8%, or less than 5%; and (xv) a 500% tensile modulus of greater than 0.5 MPa, or greater than 0.8 MPa, or greater than 1.0 MPa, or greater than 2.0 MPa.

The LEEP Copolymer may be made in the presence of a bridged metallocene catalyst, in a single steady-state reactor.

The test methods for the LEEP Copolymer are described in U.S. Pat. No. 6,525,157.

Another example of a propylene elastomer which may be used is a region-error containing propylene-ethylene copolymer (i.e., a R-EPE copolymer) as described in U.S. Patent Application Publication No. 2003/0204017 (published Oct. 30, 2003).

As disclosed in U.S. Patent Application Publication No. 2003/0204017 (published Oct. 30, 2003) paragraph [0007], the R-EPE copolymers may be characterized as comprising at least about 60 weight percent (wt. %) of units derived from propylene, about 0.1-35 wt % of units derived from ethylene, and 0 to about 35 wt % of units derived from one or more unsaturated comonomers, with the proviso that the combined weight percent of units derived from ethylene and the unsaturated comonomer does not exceed about 40. These copolymers are also characterized as having at least one of the following properties: (i) $^{13}$C NMR peaks corresponding to a regio-error at about 14.6 and about 15.7 ppm, the peaks of about equal intensity, (ii) a B-value greater than about 1.4 when the comonomer content, i.e., the units derived from ethylene and/or the unsaturated comonomer(s), of the copolymer is at least about 3 wt %, (ill) a skewness index, $S_{ix}$ greater than about −1.20, (iv) a DSC curve with a $T_{me}$ that remains essentially the same and a $T_{max}$ that decreases as the amount of comonomer, i.e., the units derived from ethylene and/or the unsaturated comonomer(s), in the copolymer is increased, and (v) an X-ray diffraction pattern that reports more gamma-form crystals than a comparable copolymer prepared with a Ziegler-Natta (Z-N) catalyst. Typically the copolymers of this embodiment are characterized by at least two, preferably at least three, more preferably at least four, and even more preferably all five, of these properties. The test methods for the R-EPE are disclosed in U.S. Patent Application Publication No. 2003/0204017.

S/LEPs

The second polymeric component herein may employ one or more other alpha-olefin elastomers, such as one or more linear ethylene copolymers or interpolymers (also known as "LEPs"), one or more substantially linear ethylene copolymers or interpolymers (also known as "SLEPs"), or both. As used herein, SLEPs typically include LEPs. Substantially linear ethylene copolymers and linear ethylene copolymers and their method of preparation are fully described in U.S. Pat. Nos. 5,272,236; and 5,278,272, which are fully incorporated herein by reference for all purposes.

As used herein, "a linear or substantially linear ethylene polymer" means a copolymer of ethylene and one or more alpha-olefin comonomers having a linear backbone, a specific and limited amount of long-chain branching or no long-chain branching, a narrow molecular weight distribution, a narrow composition distribution (e.g., for alpha-olefin copolymers) or a combination thereof. More explanation of such polymers is discussed in U.S. Pat. No. 6,403,692, which is incorporated herein by reference for all purposes.

Illustrative alpha-olefins include propylene, 1-butene, 1-hexene, 4-methyl-1-pentene, 1-heptene, 1-octane, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, bimethyl-1-pentene, 3-methyl-1-hexene, dimethyl-1-hexene, 3,3,5-trimethyl-1-hexene, methylethyl-1-heptene, trimethyl-1-heptene, dimethyloctene, ethyl-1-octane, methyl-1-nonene, ethylene-octene, vinylcyclopentene, vinylcydoliexene and vinylnorbornene, where alkyl branching position is not specified if is generally on position 3 or higher of the alkene and styrene. The alpha-olefin is desirably a $C_3$-$C_{20}$ or $C_3$-$C_{10}$ alpha-olefin. Preferred copolymers include ethylene-propylene (EP), ethylene-butene (EB), ethylene-hexene-1 (EH), and ethylene-oxide (EO) polymers, illustrative terpolymers include an ethylene/propylene/octene ferpolymer as well as terpolymers of ethylene, a $C_3$-$C_{20}$ alpha-olefin and a diene such as dicyclopentadiene, 1,4-haxadiene, piperylene or 5-ethylidene-2-norbornene.

The SLEP may include one or more higher alpha-olefin containing at least 8 carbon atoms. For example, suitable higher alpha-olefins may include one or more alpha-olefins containing from 8 to about 20 carbon atoms, more preferably one or more alpha-olefins containing from about 8 to about 12 carbon atoms. The higher alpha-olefin may include or consist essentially of 1-octene. Without limitation, exemplary SLEPs may contain greater than about 50 wt. %, and preferably greater than about 55 wt. % ethylene monomer based on the total weight of the SLEP. Exemplary SLEPs may contain less than about 85 wt. %, preferably less than about 80% and mora preferably, lass than about 70 wt. % ethylene monomer based on the total weight of the SLEP. The concentration of the higher alphaolefin in the SLEP may be greater than about 12 wt. %, more preferably greater than 20 wt. %, and most preferably greater than about 30 wt. % based on the total weight of the SLEP. For example, the SLEP may be a copolymer which contains ethylene monomer at a concentration greater than about 50 wt. % and 1-octane monomer at a concentration greater than about 12 wt. % (e.g. greater than about 20 wt. %) based on the total weight of the SLEP. Suitable SLEPs are commercially available from THE DOW CHEMICAL COMPANY under the designation of Engage®.

One preferred S/LEP for use in the second polymeric component includes one or more elastomers including an ethylene content having a density of between about 0.8 to about 0.9 g/cm$^3$ (e.g., from about 0.855 to about 0.895 g/cm$^3$) according to ASTM D 792-00. Suitable S/LEPs may have a density of at least 0.855, preferably at least 0.860, more preferably at least 0.865, most preferably at least 0.867 g/cm$^3$. The density of the S/LEPs may be less than about 0.908, preferably less than about 0.895, more preferably less than about 0.890, and most preferably less than about 0.880 g/cm$^3$. Densities are determined as measured by ASTM D 792-00. In one aspect of the invention, suitable S/LEPs will desirably exhibit a melt flow rate that makes it compatible for melt blending with the first polymeric component. For example, the ethylene elastomer may exhibit a melt flow rate according to ASTM D-1238-04c (at 230° C., 2.16 kg) of at least about 0.6, more preferably at least about 3, and still more preferably at least about 5 g/10 min. The melt flow rate also may be below about 60, more preferably below about 40, and still more preferably below about 30 g/10 min. For example, the melt flow rate may range from about 0.5 to about 60, more preferably from about 3 to about 40, and still more preferably about 5 to about 30 g/10 min.

The composition of the present invention further contemplates a second polymeric component that includes an ethylene content and preferably includes at least one soft thermoplastic which contains ethylene. Suitable soft thermoplastics which may be used in the second polymeric component may have a phase transition (e.g., a peak melting temperature, or a glass transition temperature) at a temperature greater than about 40° C. (e.g. at least a portion of the elastomer is crystalline). The soft thermoplastic may have a crystallinity from about 2% to about 14%, more preferably from about 3% to about 11% and most preferably from about 4% to about 9%, although soft thermoplastics having higher or lower crystallinity may be used.

The second polymeric component (e.g., the S/LEP, or even the propylene containing elastomer) may contain a polymer having a peak melting temperature (as measured for example by differential scanning calorimetry at a rate of about 10° C./min on a 3 mg sample of the polymer which is first cooled from 230° C. to about 0° C. at a rate of −10° C./min) less than about 105° C., preferably less than about 100° C., more preferably less than about 90° C., and most preferably less than about 82° C. (e.g., the peak melting temperature may be less than about 65° C.).

Suitable S/LEPs for the second polymeric component may exhibit a Shore A hardness according to ASTM D2240-05 of at least about 45, preferably at least about 55, more preferably at least about 60, and still more preferably at least about 65. The Shore A hardness may also be less than about 95, preferably less than about 90, more preferably less than about 85, and still more preferably less than about 80. For example, the elastomer may range from about 65 to about 95, more preferably from about 65 to about 85, and still more preferably from about 65 to about 80.

One preferred S/LEP for use in the second polymeric component includes one or more elastomers including an ethylene content having a density of between about 0.8 to about 0.9 g/cm$^3$ (e.g., from about 0.855 to about 0.895 g/cm$^3$) according to ASTM D 792-00. Suitable S/LEPs may have a density of at least 0.855, preferably at least 0.860, more preferably at least 0.865, most preferably at least 0.867 g/cm$^3$. The density of the ethylene elastomer may be less than about 0.908, preferably less than about 0.895, more preferably less than about 0.890, and most preferably less than about 0.880 g/cm$^3$. Densities are determined as measured by ASTM D792-00. In one aspect of the invention, suitable S/LEPs will desirably exhibit a melt flow rate that makes it compatible for melt blending with the first polymeric component. For example, the ethylene elastomer may exhibit a melt flow rate according to ASTM D-1238-04c (at 230° C., 2.16 kg) of at least about 0.5, more preferably at least about 3, and still more preferably at least about 5 g/10 min. The melt flow rate also may be below about 60, more preferably below about 40, and still more preferably below about 30 g/10 min. For example, the melt flow rate may range from about 0.5 to about 60, more preferably from about 3 to about 40, and still more preferably about 5 to about 30 g/10 min.

Reinforcement Material

The composition of the present invention further includes a reinforcement material and particularly a reinforcement material, such as one or more glass fibrous materials (e.g., short glass fibers, long glass fibers, or both), or other fibers (e.g., steel, carbon, the like, or otherwise), platelets (e.g., talc, wollastonite, the like, or otherwise), or combinations thereof. Preferably, the fibers will be substantially, uniformly distributed throughout the final composition. However, it may be possible to selectively locate fibers in one or more predetermined locations within the compositions.

The overall polymeric composition typically includes at least about 10, and more typically at least about 20 parts by weight of the fibrous reinforcement material. The overall polymeric composition also typically includes less than about 70, more typically less than about 50, and still more typically less than about 40 parts by weight of the fibrous reinforcement material.

It will be appreciated that in resulting final composition (e.g., in the resulting compositions or articles following a shaping step such as injection molding), fiber lengths may be reduced relative to the initial fiber length. Examples of average fiber lengths in the final composition range from above about 0.5 mm, and more specifically above about 1 mm, e.g., from about 0.5 to about 5 mm, or more specifically greater than 1 mm to about 3 mm in length (e.g. about 1 mm to about 2 mm). Preferably, at least about 50 percent by weight of the fibers will be longer than 1 mm, and more preferably at least about 65 (or even about 75) percent by weight of the fibers will be longer than 1 mm (or even longer than about 4 mm). Fiber diameters typically will range from about 3 to about 100 microns, and more specifically about 5 to about 25 microns (e.g., about 17 microns). The glass may be one or more of E-glass, S-glass, T-glass, AR-glass, C-glass, R-glass or otherwise.

It is also contemplated that the polymeric composition optionally can include one or more additives such as a surfactant, a flexibizer, a coupling agent, a flame retardant, an ignition resistant additive, a stabilizer, a colorant, an antioxidant, a mold release agent, an anti-static agent, a slip-aid (i.e., slip resistance aid), a flow enhancer, a nucleating agent, a clarifying agent, or any combination thereof. For example, one or more pigments or colorants may be added to the polymeric composition such that the parts or components are "molded-in-color." By way of example, colorants may be added to the fibrous reinforcement material. One preferred additive is a colorant, which when included is present, in a relatively small weight percentage of the overall resulting composition (e.g., less than about 5 weight percent or even less than about one weight percent). For example, the colorant may be for achieving a black appearance, a gray flannel appearance, or otherwise. Preferred examples of additives are ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize thermoplastic compositions against degradation caused by, but not limited to heat, light, and oxygen, or a mixture thereof may be used. One preferred additive is antioxidant, which, when included, is typically included in a relatively small weight percentage of the overall polymeric composition (e.g., less than about 1 or 2 percent). An example of one preferred commercially available antioxidant is IRGANOX B225 antioxidant commercially available from Ciba Specialty Chemicals Corporation. Irganox B225 antioxidant is a blend of 1 part Irganox 1010 antioxidant (Tetrakis(methylene(3,5-di-t-butyl-4-hydroxyhydrocinnamate)methane) and 1 part Irgafos 168 tris(2,4-t-butylphenyl) phosphite. Another preferred additive is a demolding agent (e.g. a wax, mold relief, sip-aid, the like, or otherwise.). One preferred demolding agent is a nitrogen or ammonia group containing compound such as an amine or an amide. One preferred amide containing compound is ethylene bisstearamide (EBS). Another preferred category of mould release agents is "stearates" such as Glycerol MonoStearate commercially available from Danisco or Ciba Specialty Chemicals under the tradename Atmer. One preferred nitrogen containing compound, which is a wax, is an erucamide sold under the tradename KENAMIDE ULTRA E, commercially available from Chemtura Corporation, Middlebury, Conn.

One preferred additive is a coupling agent, e.g., a grafted polypropylene coupling agent such as maleic anhydride, grafted polypropylene coupling agent (e.g., Polybond 3200 from Chemtura or OREVAC CA-100 from Arkema). Optionally, the polymeric composition of the present invention may include a coupling agent or be free of a coupling agent. When included, the coupling agent will be present in the resulting overall composition in an amount less than about 5 percent by weight, and more preferably less than about 2 percent by weight. For example, it may be present in an amount of at least 0.01 percent by weight or even at least about 0.1 percent by weight of the overall composition.

As discussed herein, the polymeric composition of the present invention includes a first polymeric component, a second polymeric component, and a fibrous reinforcement material. It will be appreciated that a ratio of the first polymeric component with respect to the second polymeric component does not exceed 1:4.2, and more specifically does not exceed 1:2.7. Preferably, the ratio ranges from about 5:1 to about 1:4.2, more preferably about 5:1 to about 1:2.7 of the first polymeric component to the second polymeric component.

The resulting polymeric compositions herein can be prepared according to any suitable technique for achieving the desired properties in a blended compound. Combinations of two or more ingredients may be compounded (e.g., first polymeric component and reinforcement material) prior to feeding the materials to processing epulpoient (e.g., before introduction into an injection molding apparatus). Alternatively, or in addition, two or more of the ingredients may be compounded with each other while within the processing equipment. For example, the polymeric components of the resulting composition are not melt-blended with each other until they are in the processing equipment (e.g., within a screw and barrel assembly, a mixing nozzle, injection machine, the like or otherwise). Preparation of the compositions of this invention can be accomplished using any suitable mixing means, including dry blending two or more of the individual components, melt blending, or both either directly in an apparatus used to make the finished article (e.g., the automotive part), or in a separate apparatus (e.g., pramixing in a Banbury mixer). Dry blends of the compositions can also be directly injection molded without premelt blending step. In one preferred embodiment, the formation of the polymeric composition includes mixing at least two components (e.g., the second polymeric component and the reinforcement concentrate) or mixing at least three components (e.g., first polymeric component, second polymeric component, and the reinforcement material) at the molding machine, (e.g. blending at the press). Optionally or in addition to, two or more ingredients may pre-compounded in a compounding unit prior to mixing at the molding machine.

As discussed above, the ingredients in the polymeric composition may also be compounded or melt blended in a mixer such as Banbury mixer, or in an extruder such as a kneader, a compounding single screw extruder, a twin screw extruder, a heated two-roll mill, and the like. In one aspect of the invention, after compounding the ingredients, the blended polymeric material may be palletized to form granules or pellets which are capable of being fed into a molding machine. A quantity (e.g., greater than 5 kg, preferably greater than 20 kg, or even greater than 250 kg) of the pellets or granules may be placed in a container, and stored or transported prior to molding an article.

When softened or melted by the application of heat, the polymeric compositions of this invention can be fabricated into articles using conventional techniques such as compression molding, injection molding, gas assisted injection molding, calendering, vacuum forming, thermoforming, extrusion, blow molding, alone or in combination. The polymeric compositions can also be formed, spun, or drawn into films, fibers, multi-layer laminates or extruded sheets, or can be compounded with one or more organic or inorganic substances, on any machine suitable for such purpose. In a particularly preferred embodiment, the polymeric compositions of the present invention are preferably injection molded to form a shaped resulting article, with or without an accompanying insert (e.g., as part of an insert molding process), or as part of an over-molded article.

In one preferred embodiment, it is contemplated that the first polymeric component and the second polymeric component (e.g., the soft thermoplastic), are not pre-compounded with each other in molten state prior to feeding them to an apparatus for preparing a shaped article. Rather they are admixed with each other, and first subjected to melt-blending, only upon being introduced to the apparatus (e.g., during mixing in a screw and barrel assembly of an injection molding machine).

It is possible the reinforcement material may be added in a loose individual state, or even as bundles of materials (e.g., fibers). Preferably, the reinforcement material is incorporated into the mixture as part of a cohesive concentrate form that includes the reinforcement material dispersed in a matrix of polymeric material that is compatible with or the same as the other polymeric components (e.g., first polymeric component) of the resulting overall composition. By way of example, if is contemplated that a fibrous (e.g., glass fibers) reinforcement concentrate may be utilized, wherein the fibrous phase is distributed in a polymeric matrix phase, such as a matrix phase that includes one or mom of the polymeric material discussed herein, such as a polypropylene homopolyrner. The fibrous phase is present in an amount of at least about 20 percent by weight, and more preferably greater than 50 percent by weight (e.g., about 50 to about 90 percent by weight, such as about 60 percent by weight) of the concentrate. An example of one such concentrate of fibrous reinforcement material is discussed in U.S. Patent Application Ser. No. 60/890,002, filed Aug. 16, 2007, which is hereby incorporated by reference for all purposes.

It is contemplated in one exemplary embodiment, that the polymeric composition may include the first polymeric component, the second polymeric component having an ethylene content, and the reinforcement concentrate having the reinforcement material and the polymeric msifm that includes additional polymeric material. In another exemplary embodiment, the polymeric composition may include the second polymeric component having an ethylene content, and the reinforcement concentrate having a polymeric matrix that includes the first polymeric component.

One approach is to employ fibers that are pre-treated or otherwise modified to improve one or more of their characteristics. For example, one approach is to coat the fibers with a chemical agent (e.g., a coupling agent, a surface property modifier, a stabilizer, or other suitable agent). By way of one specific example, fibers may be treated with a sizing agent for physically, chemically, or both improving the tenacity of the subsequent interfacial bond with a polymeric matrix, for protecting the surface of the fibers from damage or both. The sizing will typically include a suitable film forming agent, a coupling agent (e.g., a silane such as an alkoxysilane), and optionally a lubricant or other agent. It may be possible to include for at least part of the sizing a coupling agent as described previously (e.g., including a maleic anhydride grafted polypropylene coupling agent).

Fibers may be provided as individual fibers, chopped and/or continuous fibers, that are randomly oriented relative to each other, axially aligned relative to each other, woven, or any combination thereof, and which may thereafter be dispersed into the polymeric matrix, (e.g., a thermoplastic polymeric matrix, such as one including a polypropylene homopolymer or copolymer), it is also contemplated that the fibers will be provided in a bundle, by which the fibers are generally axially aligned.

The fibrous reinforcement concentrate material herein may be any suitable size or shape. In general, it may be elongated (e.g., as a rod), granular, substantially symmetrical in shape about at least one axis, substantially asymmetrical in shape about at least one axis, substantially solid, porous, or any combination thereof. Individual particles of the fibrous reinforcement concentrate material may have their largest dimension, (e.g., length, diameter, height, width, thickness, or otherwise), about 5 mm or larger, more specifically about 8 mm or larger, and still more specifically about 10 mm or longer. Smaller sizes are also possible as well, such as less than about 1 mm, and more specifically less than about 0.5 mm.

One approach to the manufacture of the fibrous reinforcement concentrate is to impregnate a fiber bundle with the polymer such as by art disclosed pultrusion techniques. See e.g., U.S. Pat. No. 5,834,056 "Process and Apparatus for Fiber Bundle Impregnation," which is hereby incorporated by reference for all purposes.

In general, the invention herein contemplates the manufacture of a shaped article, pursuant to which the first polymeric component, the second polymeric component, and the reinforcement concentrate are fed from individual sources (e.g., hoppers) info a screw and barrel assembly of a processing apparatus. As the material travel along the assembly, they are subject to shear and heat for causing them to melt blend with each other. Optionally, a mixing nozzle is also employed in the apparatus for assisting to melt blend. The resulting melt blended ingredients are introduced into a tool that shapes the material (e.g., a die, a mold, or other structure for imparting a shape to the introduced material).

Advantageously, it has been surprisingly found that desired properties (e.g., low gloss and improved mar resistance, scratch resistance, low temperature ductility, and dimensional stability, or otherwise) can be achieved by the disclosed proportions of the fibrous reinforcement concentrate, the first polymeric component, the second polymeric component. By way of example, articles formed compositions from the present invention will achieve an article having a soft-touch feel tactile surface with superior grain reproduction (e.g., low gloss) and improved mar resistance compared to articles formed compositions known in the art. More specifically, it has been found that the article formed using a fool with an N111 texture (e.g., an Opel N111 texture) from compositions of the present invention may achieve improved characteristics of gloss (e.g., gloss measured on a N111 texture with micro matt) according to ASTM D-542 that ranges from about 0.6 to about 1.7 GU, more specifically about 0.9 to about 1.4 GU. Furthermore, it has been found that the article formed using the compositions of the present invention may achieve improved characteristics for mar resistance (e.g., mar at 6N according to GMW 14688 of less than about 2 GU, and possibly between about 0.05 and about 1 GU; scratch resistance (e.g., scratch at 10N measured on an article formed having an N111 texture with micro matt according to PV3952 of less than about 1 dL, more typically less than about 0.5 dL; scratch at 10 N (article formed having an Audi K42 texture) according to PV3952 of less than about 0.4 dL, dimensional stability (e.g., shrinkage of less than about 5% and possibly between 0.1% to about 1%; coefficient of linear expansion (CLTE) in flow according to ASTM D-696 ranging from about 25 to about 50 mm/mm° C. and more specifically from about 30 to about 45 mm/mm° C.; and coefficient of linear expansion (CLTE) cross flow according to ASTM D-696 ranging from about 40 to about 70 mm/mm° C. and more specifically from about 45 to about 65 mm/mm° C.), or combinations thereof. Preferably, advantageous results are achieved wherein the polymeric composition is free of grafted co-polymers, free of mineral filler (e.g., talc), free of glass particles other than glass fibers, free of peroxides, or any combination thereof.

The polymeric composition of the present invention finds many advantageous applications. The present invention accordingly contemplates articles made with the present composition and methods that include one or more steps of shaping the compositions to form articles. The articles typically will be shaped. They may have a substantially constant profile along their lengths (e.g., from extrusion). They may have shapes that vary throughout the article (e.g., to include one or more surfaces that are flat, contoured, or a combination thereof. The articles herein may be composite articles. They may be articles that are insert molded, over molded, or both. For example, the present invention can be employed as part of a variety of articles of manufacture, however, it has already been found particularly suitable for use in forming articles such as a tray, a table, a plate; lawn and garden furniture, a shoe, a boot, or the like. The polymeric composition may also be used to form automotive parts such as dash board, consoles, arm rests, switch covers, brake levers, shifters, knobs, handles, control buttons, trim panels, seat back covers, instrument housings, cup holders, a panel, sun visor, rear view mirror housing, fascia (e.g., bumper fascia), automotive trim, automotive cowling, console (e.g., center overhead, floor assemblies, or both), instrument, panel, glove box assemblies including doors, knee bolster assemblies or instrument panel retainer assemblies or structural components.

Materials resulting from the teachings herein will have any combination of at least one, two (and more specifically at least 3 or all) of the following properties; namely, a flexural modulus in flow according to ISO 178 that ranges from about 200 to about 4000 MPa and more specifically about 350 to about 3500 MPa; flexural modulus in cross flow according to ISO 178 that ranges from about 50 to about 2500 MPa and more specifically about 150 to about 1950 MPa; average flexural modulus according to ISO 178 that ranges from about 50 to about 3000MPa and more specifically about 150 to about 2000 MPa; Charpy Impact notched RT according to ISO 179-1eU that ranges from about 5 to about 50 kJ/m$^2$ and more specifically about 11 to about 45 kJ/m$^2$; Charpy impact notched −20° C. according to ISO 179-1eU that ranges from about 1 to about 35 kJ/m$^2$ and more specifically about 4 to about 28 kJ/m$^2$; Coefficient of Friction (static) according to ASTM D-1894 that ranges from about 0.2 to about 0.7 and more specifically about 0.1 to about 0.6; and Coefficient of Friction (dynamic) according to ASTM D-1894 that ranges from about 0.5 to about 0.75 and more specifically about 0.2 to about 0.5. It should be appreciated that the average flexural modulus is the average of the in-low and cross-flow modulus. By way of example, the average flexural modulus may be obtained by the cutting off test bars from a molded plague having a film gate on one side. The test bars that are cut along the direction of the film gate are used for determining the in-flow modulus and the test bars that are cut perpendicular to the flow are used to determine the cross-flow modulus.

EXAMPLES

Examples 1-6

Examples (EX.) 1 through 6 are prepared by injection molding the compositions of TABLE 1. The first polymeric component (a polypropylene homopolymer), the second polymeric component (a propylene-ethylene elastomer), and the reinforcement concentrate (containing long glass fiber and additional first polymeric component polypropylene) are dry blended and then introduced into a DEMAG 100 injection molding machine, in which they are melt-blended (i.e., the solid, dry-blended pellets, after being introduced into the screw of the injection molding machine melt and become blended) prior to injection into a mold cavity for forming the test samples. The data in TABLE 1 illustrates the expected results.

Examples 7-15

EXAMPLES 7 through 15 are prepared using the same procedure as EXAMPLES 1-6, using the formulation given in TABLE 2. In addition to the first component, the second component and the reinforcement material, EXAMPLES 7 through 15 also include a color concentrate which is dry blended with the other ingredients and then introduced into the DEMAG injection molding machine, data in TABLE 2 illustrates the expected results.

Examples (EX.) 16-23 and Comparative Example (C.E.) 24

Molded parts are prepared by injection molding the compositions of TABLE 3 using the same method as used in EXAMPLES 7 through 15, in EX. 16-22, the second polymeric component is a S/LEP, and specifically an ethylene-ocfeoe copolymer. EX. 23 uses a propylene-ethylene elastomer as the second polymer component. C.E. 24 is a comparative example which includes talc instead of the long glass fiber containing reinforcement concentrate.

TABLE 1

|  | Method | Units | EX. 1 | EX. 2 | EX. 3 | EX. 4 | EX. 5 | EX. 6 |
|---|---|---|---|---|---|---|---|---|
| Ingredient |  |  |  |  |  |  |  |  |
| Reinforcement Cocentrate-A |  |  | 42 | 42 | 42 | 42 | 42 | 42 |
| Elastomer A |  |  | 44.9 | 25 | 15 |  |  |  |
| Elastomer B |  |  |  |  |  | 58 | 42 |  |
| Elastomer C |  |  |  |  |  |  |  | 58 |
| PP-A |  |  | 13.1 |  |  |  |  |  |
| PP-B |  |  |  | 33 | 43 |  | 16 |  |
| Total |  |  | 100 | 100 | 100 | 100 | 100 | 100 |
| Property |  |  |  |  |  |  |  |  |
| Ethylene Content in Elastomer (%) |  |  | 15 | 15 | 15 | 9 | 9 | 5 |
| Average Flexural Modulus | ISO 178 | MPa | 1228 | 2252 | 2673 | 1609 | 1794 | 1861 |
| Charpy RT | ISO 179-1eU | kJ/m2 | 39 | 23 | 24 | 29 | 20 | 17 |
| Charp −20 C. | ISO 179-1eU | kJ/m2 | 25 | 12 | 13 | 14 | 12 | 10 |
| VICAT Softenting Point-50/5 | ISO 6603-3 | ° C. |  | 80 | 116 |  | 87 | 97 |
| VICAT Softening Point-120/10 | ISO 6603-3 | ° C. | 120 | 162 | 164 | 126 | 160 | 160 |
| Gloss (N111 texture with micro matt) | ASTM D-542 | GU | 1.0 | 1.1 | 1.1 | 0.9 | 1.0 | 1.0 |
| Mar 6N (N111 texture with micro matt) | GMW 14688 | dGU | 0.2 | 0.3 | 0.3 | 0.2 | 0.2 | 0.2 |

S/LEP-A is a copolymer containing about 59 wt. % ethylene monomer units and about 41 wt. % octene monomer units. This ethylene elastomer has a specific gravity of about 0.868 as measured according to ASTM D792, a hardness of about 70 Shore A as measured according to ASTM D2240, a peak melting temperature of about 55° C. as measured by differential scanning calorimetry, a flexural modulus of about 14.4 MPa as measured according to ASTM D790 (using compression molded samples and tested at 2% secant), a melt flow rate of about 0.5 g/10 min as measured according to ASTM D1238 at 190° C./2.16 kg, a tensile strength at 100% strain of about 2.6 MPa as measured according to ASTM D638 at a strain rate of 510 mm/min, a tensile strength at break of about 9.5 MPa as measured according to ASTM D638 at a strain rate of 510 mm/min, a tensile elongation at break of about 810% as measured according to ASTM D638 at a strain rate of 510 mm/min, and a Vicat softening point of about 46° C. as measured according to ASTM D1525.

S/LEP-B is a copolymer containing about 59 wt. % ethylene monomer units and about 41 wt. % octane monomer units. This ethylene elastomer has a specific gravity of about 0.870 as measured according to ASTM D792, a hardness of about 66 Shore A as measured according to ASTM D2240, a peak melting temperature of about 59° C. as measured by differential scanning calorimetry, a flexural modulus of about 10.8 MPa as measured according to ASTM D790 (using compression molded samples and tested at 2% secant), a melt flow rate of about 5.0 g/10 min as measured according to ASTM D1238 at 190° C./2.16 kg, a tensile strength at 100% strain of about 2.3 MPa as measured according to ASTM D638 at a strain rate of 510 mm/min, a tensile strength at break of about 5.7 MPa as measured according to ASTM D638 at a strain rate of 510 mm/min, a tensile elongation at break of about 1100% as measured according to ASTM D638 at a strain rate of 510 mm/min, and a Vicat softening point of about 37° C. as measured according to ASTM D1525.

S/LEP-C is a copolymer containing about 59 wt. % ethylene monomer units and about 41 wt. % octane monomer units. This ethylene elastomer has a specific gravity of about 0.870 as measured according to ASTM D792, a hardness of about 72 Shore A as measured according to ASTM D2240, a peak melting temperature of about 60° C. as measured by differential scanning calorimetry, a flexural modulus of about 12.1 MPa as measured according to ASTM D790 (using compression molded samples and tested at 2% secant), a melt flow rate of about 30 g/10 min as measured according to ASTM D1238 at 190° C./2.16 kg, a tensile strength at 100% strain of about 3.3 MPa as measured according to ASTM D638 at a strain rate of 510 mm/min, a tensile elongation at break of about 1000% as measured

TABLE 2

|  | Ex. 7 | Ex. 8 | Ex. 9 | Ex. 10 | Ex. 11 | Ex. 12 | Ex. 13 | Ex. 14 | Ex. 15 |
| --- | --- | --- | --- | --- | --- | --- | --- | --- | --- |
| Reinforcement Concentrate-A | 42 | 42 | 42 | 42 | 42 | 42 | 42 | 42 | 42 |
| Elastomer A | 43.1 | 44.9 | 44.9 | 46.7 |  |  |  |  |  |
| Elastomer B |  |  |  |  |  |  |  | 46.7 | 54 |
| Elastomer D |  |  |  |  | 43.1 | 44.9 | 44.9 |  |  |
| PP-A | 10.9 | 9.1 |  | 7.3 | 10.9 | 9.1 |  | 7.3 |  |
| PP-B |  |  | 9.1 |  |  |  | 9.1 |  |  |
| CC-A | 4 | 4 | 4 | 4 | 4 | 4 | 4 | 4 | 4 |
| Total | 100 | 100 | 100 | 100 | 100 | 100 | 100 | 100 | 100 |
| Property, Method (Units) |  |  |  |  |  |  |  |  |  |
| Ethylene Content in Elastomer (wt. %) | 15 | 15 | 15 | 15 | 12 | 12 | 12 | 9 | 9 |
| Flexural Modulas in Flow Direction, ISO 178 (MPa) | 955 | 1225 | 1225 | 888 | 1986 | 1684 | 1561 | 2044 | 1836 |
| Static Coefficient of Friction, ASTM D-1894 | 0.43 | 0.38 | 0.43 | 0.42 | 0.37 | 0.38 | 0.38 | 0.32 | 0.32 |
| Dynamic Coefficient of Fricton, ASTM D-1894 | 0.35 | 0.33 | 0.38 | 0.37 | 0.31 | 0.34 | 0.33 | 0.25 | 0.28 |
| Hardness, ASTM D-2250 (Shore D) | 45 | 44 | 44 | 42 | 53 | 52 | 52 | 59 | 56 |
| Gloss (N111 texture with micro matt), ASTM D-542 (GU) | 1.4 | 1.4 | 1.3 | 1.3 | 1.3 | 1.4 | 1.3 | 1.2 | 1.2 |
| Mar 6N (N111 texture with micro matt), GMW 14688 (GU) | 0.4 | 0.4 |  |  |  |  | 0.6 |  | 0.5 |
| scratch 10N (Audi K42 texture), PV3952 (dL) |  | 0.2 |  | 0.16 |  | 0.15 | 0.27 | 0.11 |  |
| Vicat Softening Point - 120/10, ISO 6603-3 (° C.) |  | 88 | 84 | 80 | 104 | 105 | 112 | 135 | 119 |
| Charpy at RT, ISO 179-1eU (KJ/m$^2$) |  |  |  | 28 |  |  | 15 |  | 11 |
| Charpy at −20° C., ISO 179-1eU (KJ/m$^2$) |  |  |  | 14 |  |  | 7 |  | 6 |

Elastomer-A is a propylene-ethylene copolymer containing about 15 wt. % ethylene monomer units and about 85 wt. % propylene units. Elastomer-A has a specific gravity of about 0.876 as measured according to ASTM D792, a durometer hardness of about 72 Shore A and about 19 Shore D as measured according to ASTM D2240, a peak melting temperature expected between about 30° C. and about 50° C. as measured by differential scanning caiorimetry, a crystaliinity of about 14% as measured by differential scanning caiorimetry (@10° C./min), a flexural modulus of about 8 MPa as measured according to ISO 178 (using injection molded samples and tested at 1% secant), a melt flow rate of about 8 g/10 min as measured according to ASTM D1238 at 230° C./2.16 kg, a tensile stress at yield of about 1.5 MPa as measured according to ISO 527-1,-2, a tensile stress at break of about 2.05 MPa as measured according to ISO 527-1,-2, end a tensile elongation at break of about 250% as measured according to ISO 527-1,-2.

Elastomer-B is a propylene-ethylene copolymer containing about 9 wt. % ethylene monomer units and about 91 wt. % propylene units. Elastomer-B has a specific gravity of about 0.863 as measured according to ASTM D792, a durometer hardness of about 95 Shore A and about 43 Shore D as measured according to ASTM D2240, a peak melting temperature expected at about 85° C. as measured by differential scanning calorimetry, a crystallinity of about 30% as measured by differential scanning caionmetry (@10° C./min), a flexural modulus of about 105 MPa as measured according to ISO 178 (using injection molded samples and tested at 1% secant), a melt flow rate of about 8 g/10 min as measured according to ASTM D1238 at 230° C./2.16 kg, a tensile stress at yield of about 7.0 MPa as measured according to ISO 527-1,-2, a tensile stress at break of about 15.5 MPa as measured according to ISO 527-1,-2, a tensile elongation at break of greater than about 640% as measured according to ISO 527-1,-2, and a Vicat softening point of about 64° C. as measured according to ASTM D1525.

Elastomer-C is a propylene-ethylene copolymer containing about 5 wt. % ethylene monomer units and about 93 wt. % propylene units. Elastomer-C has a specific gravity of about 0.888 as measured according to ASTM D792, a durometer hardness of about 96 Shore A and about 54 Shore D as measured according to ASTM D2240, a peak melting temperature expected at about 115° C. as measured by differential scanning calorimetry, a crystallinity of about 44% as measured by differential scanning calorimetry (@10° C./min), a flexural modulus of about 400 MPa as measured according to ISO 178 (using injection molded samples and tested at 1% secant), a melt flow rate of about 8 g/10 min as measured according to ASTM D1238 at 230° C./2.16 kg, a tensile stress at yield of about 16 MPa as measured according to ISO 527-1,-2, a tensile stress at break of about 23 MPa as measured according to ISO 527-1,-2, a tensile elongation at break of greater than about 630% as measured according to ISO 527-1,-2, and a Vicat softening point of about 98° C. as measured according to ASTM D1525.

Elastomer-D is a propylene-ethylene copolymer containing about 12 wt. % ethylene monomer units and about 88 wt. % propylene units. Elastomer-D has a specific gravity of about 0.864 as measured according to ASTM D792, a durometer hardness of about 70 Shore A as measured according to ASTM D2240, a peak melting temperature expected at about 50° C. as measured by differential scanning calorlmetry, a crystallinity of about 14% as measured by differential scanning calorimetry (@10° C./min), a flexural modulus of about 32 MPa as measured according to ISO 178 (using injection molded samples and tested at 1% secant), a melt flow rate of about 25 g/10 min as measured according to ASTM D1238 at 230° C./2.16 kg, a tensile stress at yield of about 2.8 MPa as measured according to ISO 527-1,-2, a tensile elongation at break of greater than about 67% as measured according to ISO 527-1,-2, and a Vicat softening point of less than bout 30° C. as measured according to ASTM D1525.

Elastomer-E is a propylene-ethylene copolymer containing greater than about 9 wt. % ethylene monomer units and about 91 wt. % propylene units. Elastomer-E has a specific gravity of about 0.876 as measured according to ASTM D792, a durometer hardness of about 94 Shore A and about 42 Shore D as measured according to ASTM D2240, a peak melting temperature expected at about 80° C. as measured by differential scanning calorimetry, a crystallinity of about 29% as measured by differential scanning calorimetry (@10° C./min), a flexural modulus of about 108 MPa as measured according to ISO 178 (using injection molded samples and tested at 1% secant), a melt flow rate of about 25 g/10 min as measured according to ASTM D1238 at 230° C./2.16 kg, a tensile stress at yield of about 7 MPa as measured according to ISO 527-1,-2, a tensile stress at break of about 12 MPa as measured according to ISO 527-1,-2, a tensile elongation at break of greater than about 630% as measured according to ISO 527-1,-2, and a Vicat softening point of about 60° C. as measured according to ASTM D1525.

PP-A is a polypropylene homopotymar which contains at least 95 wt. % isotaciic polypropylene. PP-A has a density of about 0.900 g/cm$^3$ as measured according to ISO 1183, a Charpy notched impact strength at 23° C. of about 2.5 KJ/m$^2$ as measured according to ISO 179/eA, a peak melting temperature greater than about 160° C. as measured by differential scanning calorimetry, an expected crystaiiinity of greater than about 50% as measured by differential scanning calorimetry, a flexural modulus of about 1650 MPa as measured according to ISO 178, a melt flow rate of about 52 g/10 min as measured according to ISO 1133 at 230° C./2.16 kg, a tensile stress at yield of about 37.0 MPa as measured according to ISO 527-1,-2, a tensile elongation at yield of about 9% as measured according to ISO 527-1,-2, and a Vicat softening point of about 156° C. as measured according to ASTM D1525.

PP-B is a polypropylene homopotymar which contains at least 95 wt. % isotactic polypropylene. PP-B has a density of about 0.90 g/cm$^3$ as measured according to ISO 1183, a Charpy notched impact strength at 23° C. of about 2.5 kJ/m$^2$ as measured according to ISO 179-1/1 eA, a peak melting temperature greater than about 156° C. as measured by differential scanning calorimetry, an expected crystaiiinity of greater than about 50% as measured by differential scanning calorimetry, a flexural modulus of about 1650 MPa as measured according to ISO 178, a melt flow rate of about 52 g/10 min as measured according to ISO 1133 at 230° C./2.16 kg, a tensile strength at yield of about 37 MPa as measured according: to ISO 527-2, a tensile elongation at yield of about 9% as measured according fo ISO 527-2, and a Vicat softening point of about 152° C. as measured according to ASTM D1525.

PP-C is a polypropylene impact copolymer which contains an isotactic polypropylene phase and an elastomeric copolymer phase. PP-A has a density of about 0.900 g/cm$^5$ as measured according to ISO 1183, a Charpy notched impact strength at 23° C. of about 4 KJ/m$^3$ as measured according to ISO 179/eA, a peak malting temperature greater than about 152° C. as measured by differential scanning calorlmetry, an expected crystalllnlty of greater than about 45 wt. % as measured fey differential scanning calorimetry, a flexurel modulus of about 1450 klPa as measured according to ISO 178, a melt flow rate of about 44 g/10 min as measured according fo ISO 1133 at 230° C./2.16 kg, a tensile stress at yield of about 28.0 MPa as measured according to ISO 527-1,-2, a tensile elongation at yield of about 7% as measured according to ISO 527-1,-2, and a Vical softening point of about 152° C. as measured according to ASTM D1525.

PP-D is an impact polypropylene fsomopolymer which contains at least 80 wt. % isotactic polypropylene and an elastomeric copolymer phase. PP-C has a density of about 0.90 g/cm$^3$ as measured according to ISO 1183, a Charpy notched impact strength at 23° C. of about 10 kJ/m$^2$ as measured according to ISO 179-1/1eA, a peak melting temperature greater than about 156° C. as measured by differential scanning calorimetry, an expected crystallinity of greater than about 45 wt. % as measured by differential scanning calorimetry, a flexural modulus of about 1450 MPa as measured according to ISO 178, a melt flow rate of about 12 g/10 min as measured according to ISO 1133 at 230° C./2.16 kg, a tensile strength at yield of about 28 MPa as measured according to ISO 527-2, a tensile elongation at yield of about 8% as measured according to ISO 527-2, and a Vicat softening point of about 152° C. as measured according to ASTM D1525.

CC-A is a color concentrate. CC-B and CC-C are color concentrates which contain a colorant, a UV stabilizer and a slip agent in a polypropylene carrier.

Reinforcement Concentrate-A is a concentrate containing about 60 wt. % long glass fibers and about 40 wt. % PP-B.

Reinforcement Concentrate-B, Reinforcement Concentrate-C, and Reinforcement Concentrate-D each include about 60 wt. % long glass fibers, about 2 wt. % coupling agent, about 36 wt. % polypropylene having a melt flow rate greater than about 40 g/10 min (tested according to ISO 1133 at 230° C./2.16 kg, such as PP-B), and a heat stabilizers at a concentration of less than about 2 wt. %.

TABLE 3

| | method | unit | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|
| COMPOSITIONS | | | | | | | | | | | |
| Reinforcement Concentrate B | | wt % | 42 | 42 | 42 | 42 | 34 | 42 | 42 | | |
| Reinforcement Concentrate C | | wt % | | | | | | | | 42 | |
| Talc | | wt % | | | | | | | | | 20 |
| S/LEP-A | | wt % | 27 | 30 | | | | | | | |
| S/LEP-B | | wt % | | | 34 | 34 | 35 | | | | 20 |
| S/LEP-C | | wt % | | | | | | 27 | 27 | | |
| Elastomer-B | | wt % | | | | | | | | 25 | |
| PP-C (copoly) | | wt % | | 24 | 20 | | | | 27 | | 56 |
| PP-B (homo) | | wt % | 27 | | | 20 | 37 | 27 | | 33 | |
| CC-B | | wt % | 4 | 4 | 4 | 4 | 4 | 4 | 4 | 4 | 4 |
| Total | | wt % | 100 | 100 | 100 | 100 | 100 | 100 | 100 | 100 | 100 |
| PROPERTIES | | | | | | | | | | | |
| Ethylene Content in S/LEP or Elestomer-B | | wt % | 58.7 | 58.7 | 58.8 | 58.8 | 58.8 | 58.6 | 58.6 | 15 | 58.8 |
| Notched Charpy impact strength at about 23° C. | ISO 179-1eU | kJ/m$^2$ | 24 | 30 | 23 | 19 | 12 | 8.8 | 36 | 23 | 35 |
| Average Flexural Modulus | ISO 178 | MPa | 2128 | 1929 | 2185 | 1569 | 2132 | 1995 | 1739 | 2252 | 1500 |
| Heat Distortion Temperature 1.82 | ISO 75 | ° C. | 112 | 96 | 90 | 81 | 117 | 100 | 80 | 80 | 53 |
| Vicat Softening Point | ISO 306A | ° C. | 156 | 144 | 146 | 123 | 157 | 147 | 137 | 162 | 115 |
| Gloss 60° (N111 texture with micro matt) | ASTM D-542 | GU | 1.1 | 1.1 | 1.1 | 1.1 | 1.2 | 1.2 | 1.3 | 1.1 | 1.4 |
| gloss 85° (N111 texture with micro matt) | ASTM D-542 | GU | 0.8 | 0.8 | 0.7 | 0.7 | 0.9 | 0.9 | 1 | 0.8 | 1.2 |
| gloss 85° (MT10407 Volvo grain) | ASTM D-542 | GU | 1.5 | 1.5 | 1.5 | 1.6 | 1.6 | 1.5 | 1.6 | 1.5 | 1.9 |
| Mar 6N, 60° (N111 texture with micro matt) | GMW 14688 | dGU | 0.3 | 0.2 | 0.3 | 0.3 | 0.4 | 0.3 | 0.3 | 0.3 | 0.8 |
| Mar 6N, 85° (N111 texture with micro matt) | GMW 14688 | dGU | 0.9 | 0.8 | 0.9 | 0.8 | 1.1 | 0.8 | 0.7 | 0.8 | 1.1 |
| scratch - 18 N (MT10407 | PV3952 | dL | −0.1 | −0.1 | 0 | 0 | 0 | 1.9 | 1.2 | 0.2 | 0.3 |

The first polymeric component, the second polymeric component, and the reinforcement concentrate are dry blended and introduced into a Demag 100 injection molding machine, in which they are melt-blended prior to injection into a mold cavity for forming the test samples. The data in TABLE 3 illustrates the expected results. C.E. 24, which does not contain the long glass fibers has a low heat distortion temperature and a low Vicat softening point, as well as inferior, gloss, scratch resistance, and mar resistance properties.

D9100.05, D8507.15, and D9530.05 are ethylene/α-olefin interpolymers which are block having at least one hard block and at least plurality of soft block. These block copolymers are available commercially from Dow Chemical Company under the tradename INFUSE™ and contain ethylene and octene monomers. The properties of these interpolymers are given in TABLE 4 below.

Examples 25 Through 31

Molded parts are prepared by injection molding the compositions of TABLE 5 using the same method as used in EXAMPLES 7 through 15. In EX. 25-31, the second polymeric component is a propylene-ethylene elastomer.

The first polymeric component, the second polymeric component, and the reinforcement concentrate are dry blended and introduced into a Demag 100 injection molding machine, in which they are melt-blended prior to injection into a mold cavity for forming the test samples. The data in TABLE 5 illustrates the expected results.

TABLE 4

| Property, Test Method (Units) | Ethylene/α-olefin Interpolymer - Block Copolymer | | |
|---|---|---|---|
| | D9100.05 | D9507.15 | D9530.05 |
| Melt Flow Rate, ASTM D1238 @190° C./2.15 kg (g/10 min) | 1 | 5 | 5 |
| Durometer Hardness, ASTM D2240 (Shore A) | 75 | 59 | 86 |
| Concentration of Hard Blocks (wt. %) | 27.3 | 12.4 | 40.8 |
| Comonomer type | octene | octene | octene |
| Density, ASTM D792 (g/cm$^3$) | 0.88 | 0.87 | 0.89 |
| Flexural Modulus 2% secant, ASTM D790 (MPa) | 19 | 14 | 56 |
| Melting Temperature, DSC @10° C./min (° C.) | 120 | 119 | 119 |
| Ultimate Tensile Elongation, ASTM D638 (%) | 2510 | 1607 | 701 |

Examples 32 Through 35

Molded parts are prepared by injection molding the compositions of TABLE 8 using the same method as used in EXAMPLES 32 includes a propylene-ethylene elastomer, EX. 33 includes an S/LEP, EX. 34 includes a block copolymer, and EX. 35 includes Nordel™ IP4770P elastomer, commercially available from The Dow Chemical Company.

Nordel™ IP4770P is an ethylene propylene diene polymer (EPDM rubber) containing about 70 wt. % ethylene, about 25 wt. % propylene and about 5 wt. % of a diene (such as ethylidenenorbornene). Nordel IP4770P is a random copolymer and has a Mooney Viscosity of about 70 as measured according to ASTM D1646 at ML1_4@125° C. (and an expected melt index as measured according to ISO 1133 at 190° C./2.16 kg of less than about 0.2 g/10 min).

The first polymeric component, the second polymeric component, and the reinforcement concentrate are dry blended and introduced into a Demag 100 injection molding machine, in which they are melt-blended prior to injection into a mold cavity for forming the test samples. The data in TABLE 6 illustrates the expected results.

TABLE 5

| | EX. 25 | EX. 26 | EX. 27 | EX. 28 | EX. 29 | EX. 30 | EX. 31 |
|---|---|---|---|---|---|---|---|
| Ingredient | | | | | | | |
| Reinforcement Concentrate-D | 42 | 42 | 42 | 42 | 42 | 42 | 42 |
| D9500.01 | 30 | 40 | | | | | |
| D9507.15 | | | 30 | 40 | | | |
| D9530.05 | | | | | 30 | 30 | 40 |
| PP-B | 24 | 14 | 24 | 14 | 24 | | 14 |
| PP-C | | | | | | 24 | |
| CC-B | 4 | 4 | 4 | 4 | 4 | 4 | 4 |
| Total, wt. % | 100 | 100 | 100 | 100 | 100 | 100 | 100 |
| Property, Method (Units) | | | | | | | |
| Notched Charpy Impact Strength at about 23° C., ISO 179 1eU (kJ/m$^2$) | 16 | 25 | 22 | 22 | 20 | 26 | 21 |
| Notched Charpy Impact Strength at about −20° C., ISO 179 1eU (kJ/m$^2$) | 12 | 19 | 19 | 19 | 9 | 12 | 10 |
| Average Flexural Modulus, ISO 178 (MPa) | 2017 | 1254 | 1947 | 1196 | 2078 | 1644 | 1483 |
| Heat Distortion Temperature @1.8 MPa, ISO 75 (° C.) | 95.2 | 72.3 | 99.9 | 63.5 | 108 | 104 | 93 |
| Vicat Softening Point, ISO 306A (° C.) | 139.1 | 98.7 | 144 | 99 | 142 | 129 | 118 |
| Scratch 18N MT 10407, ASTM D-542 (dL) | 0.0 | −0.5 | 0.4 | 0.1 | 0 | 0 | −0.4 |
| Mar 7N N111 @85°, ASTM D-842 (dGU) | 0.7 | 0.5 | 0.7 | 0.4 | 0.4 | 0.4 | 0.4 |
| Gloss N111 @85°, ASTM D-542 (GU) | 0.8 | 0.8 | 0.8 | 0.8 | 0.9 | 0.8 | 0.8 |

TABLE 6

| | EX. 32 | EX. 33 | EX. 34 | C.E. 35 |
|---|---|---|---|---|
| Ingredient | | | | |
| Reinforcement Concentrate-D | 42 | 42 | 42 | 42 |
| S/LEP B (ethylene-octene) | | 34 | | |
| Elastomer-B (propylene-ethylene) | 54 | | | |
| Infuse D9100.05 (ethylene-propylene block copolymer) | | | 30 | |
| Nordel IP 4770P (EPDM) | | | | 40 |
| PP-B (PP homopolymer, 52 MFR) | | 20 | 24 | 14 |
| CC-B (color concentrate) | 4 | 4 | 4 | 4 |
| Total, wt. % | 100 | 100 | 100 | 100 |
| Property, Method (Units) | | | | |
| Charpy Impact Strength at RT, ISO 179 1eU (kJ/m$^2$) | 29 | 19 | 16 | 20 |
| Average Flexural Modulus, ISO 178 (MPa | 1559 | 1569 | 2017 | 1825 |
| Heat Distortion Temperature @1.8 MPa, ISO 75 (° C.) | 66 | 81 | 95 | 84 |
| Vicat Softening Point, ISO 306A (° C.) | 124 | 123 | 139 | 127 |
| Gloss N111 @85°, ASTM D-542 (GU) | 0.6 | 0.7 | 0.8 | 0.6 |
| Mar 7N N111 @85°, ASTM D-542 (dGU) | 0.5 | 0.8 | 0.7 | 0.3 |
| Scratch 18N MT, 10407ASTM D-542 (dL) | 0.1 | 0.0 | 0.1 | 0.8 |

Examples 36 Through 39 and Comparative Example 40

Molded parts are prepared by injection molding the compositions of TABLE 7 using the same method as used in EXAMPLES 7-15. EXAMPLE 36 includes a propylene-ethylene elastomer, and EXAMPLES. 37-39 includes an S/LEP. C.E, 40 contains SOFTELL CA02A, which is a rubbery $C_2$-$C_3$ copolymer having a C2 content of about 40 wt. % and a $C_3$ content of about 60 wt. % and is obtainable from Bassell in Italy. These Examples also include a color concentrate (CC-C), Orevac CA® 100 which is a maleic anhydride grafted polypropylene available from Arkema Inc (Philadelphia, Pa., USA), and CMPP 13.00 is a concentrate of an additives package including a heat stabilizer in a thermoplastic carrier.

TABLE 7

| | EX. 36 | EX. 37 | EX. 38 | EX. 39 | C.E. 40 |
|---|---|---|---|---|---|
| CS EC 13 636, glass fibers | 24.96 | 24.96 | 24.96 | 20.16 | 24.96 |
| Elastomer-A | 24.96 | | | | |
| S/LEP-C | | 23.04 | | | |
| S/LEP-B | | | 28.80 | 30.72 | |
| SOFTELL CA02A | | | | | 33.60 |
| PP-B | 43.78 | | | | |
| PP-D | | 46.66 | 40.90 | | 36.10 |
| PP-C | | | | 43.78 | |
| Orevac ® CA100 | 1.92 | 0.96 | 0.96 | 0.96 | 0.96 |
| CMPP 13.00 | 0.38 | 0.38 | 0.38 | 0.38 | 0.38 |
| CC-C | 4.00 | 4.00 | 4.00 | 4.00 | 4.00 |
| | 100.00 | 100.00 | 100.00 | 100.00 | 100.00 |

The first polymeric component, the second polymeric component, the glass fibers, the maleic grafted PP, the color concentrate and the additives package concentrate are compounded in a twin screw extruder to blend melt-blend the materials, and then extruded into pellets or granules. The pellets or granules are then introduced into a Demag 100 injection molding machine, in which they are melted prior fo injection into a moid cavity for forming the test samples.

TABLE 8

| Property, Method (Units) | EX. 36 | EX. 37 | EX. 38 | EX. 39 | C.E. 40 |
|---|---|---|---|---|---|
| Density, g/cm$^3$ | | 1.08 | | | |
| Melt Flow Rate, ISO 1133 230° C./2.16 kg (g/10 min) | 13.9 | 8.9 | 6.1 | 14 | 2.3 |
| n, Charpy Impact @RT, ISO 179 1eU (kJ/m$^2$) | 24 | 30 | 37 | 30 | 27 |
| Average Flexural Modulus, ISO 178 (MPa | 1630 | 1630 | 1301 | 1124 | 1455 |
| Heat Distortion Temperature @1.8 MPa, ISO 75 (° C.) | 57 | 53 | 48 | 51 | 52 |
| Vicat Softening Temperature, ISO 306A (° C.) | 154 | 131 | 126 | 114 | 142 |
| Gloss before Mar @85°, ASTM D-542 (GU) | 1.0 | 0.9 | 0.9 | 0.9 | 1.0 |
| Mar 7N N111 @85°, ASTM D-542 (dGU) | 0.5 | 0.3 | 0.3 | 0.4 | 0.6 |
| Gloss N111 MM@85°, ASTM D-542 (GU) | 1.2 | 1.3 | 1.3 | 1.2 | 1.1 |
| Gloss MT10407 @85°, ASTM D-542 (GU) | 1.5 | 1.5 | 1.5 | 1.5 | 1.3 |
| Scratch 18N MT 10407, ASTM D-542 (dL) | 0.0 | −0.5 | −0.7 | −0.2 | 0.2 |

The data in TABLE 8 illustrates the expected results for EXAMPLES 36-39 and COMPARATIVE EXAMPLE 40. Comparative Example 40 requires a high concentration of the SOFTELL CA02A to achieve a flexural modulus comparable to the flexural modulus of the samples containing the propylene elastomer or the S/LEP. Comparative Example 40 also has an undesirably low melt flow rate. The higher melt flow rates of EXAMPLES 38-39 are preferred for these polymedo compositions.

It should be understood that various ingredients may be substituted, added, or removed from the above formulations without departing from the scope of the present invention. Moreover, it is contemplated that the weight percentages of the above ingredients and the values of the properties listed may vary up to or greater than 5%, 10%, 25%, or 50% of the values listed. For example, a value of 10 may vary by 10%, which may result in a range of about 9 to about 11.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the invention of a range in terms of at "x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

As used herein the terms "polymer" and "polymerization" are generic, and can include either or both of the more specific cases of "homo-" and copolymer" and "homo- and oopolymerization", respectively.

It is understood that the above description is intended to be illustrative and not restrictive. Many embodiments as well as many applications besides the examples provided will be apparent to those of skill in the art upon reading the above description. The scope of the invention should, therefore, be determined not with reference fo the above description, but should instead be determined with reference to the appended claims, along with the full scope of equivalents to which such claims are entiled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A soft-touch feel polymeric composition comprising a blend of:

i. at least about 20 weight percent and less than 55 weight percent of a first polymeric component including a relatively hard thermoplastic, wherein the first polymeric component is an isotactic polypropylene homopolymer, a random polypropylene copolymer, an impact polypropylene, a high density polyethylene, a low density polyethylene, a linear low density polyethylene, a medium density polyethylene, or any combination thereof, having a crystaiiinity of greater than about 31 weight percent as measured according to ASTM D3418.03;

ii. greater than 25 weight percent and less than about 60 weight percent of a second polymeric component including a relatively soft thermoplastic as compared with the first polymeric component, wherein the relatively soft thermoplastic is a lower-α-olefin/α-olefin interpolymer ("LAO/α-olefin interpolymer") which is a multiblock copolymer having one or more hard blocks and one or more soft blocks, wherein the one or more hard blocks are A Blocks and the one or more soft blocks are B blocks, the multiblock copolymer having the structure of $(AB)_n$, $(AB)_nA$, or $B(AB)_n$, where n is greater than 1; the LAO/α-olefin interpolymer has a density of 0.860 to 0.900 g/cm$^3$; the LAO/α-olefin interpolymer includes a first monomer that is ethylene or propylene, and a second monomer that is butene or octene, wherein the concentration of the second monomer is greater than 6 mole percent and less than 30 mole percent, based on the total moles of monomer in the LAO/α-olefin interpolymer; the total amount of the first and second monomer is greater than about 95 weight percent, based on the total weight of the LAO/α-olefin interpolymer; the concentration of the B blocks is about 50 to about 90 weight percent, based on the total weight of the LAO/α-olefin interpolymer; the concentration of the first monomer in the A blocks is greater than about 95 weight percent, and the concentration of the second monomer in the B blocks is greater than about 8 weight percent;

iii. 10 to 40 weight percent glass fibers, based on the total weight of the polymeric composition, wherein the glass fibers have an average length from about 0.5 to about 5 mm in the composition, and a diameter from about 3 to about 100 microns; and iv. less than 5 weight percent of a grafted polypropylene; and wherein the LAO/α-olefin interpolymer has a melt index greater than about 0.2 and less than about 20, as measured according to ASTM D1238 Condition 190° C./2.16 kg when the first monomer is ethylene and ASTM D1238 Condition 230° C./2.16 kg when the first monomer is propylene; and the polymeric composition is characterized by a melt flow rate of at least about 5 g/10 min as measured according to ASTM D-1238 Condition 230° C./2.16 kg.

2. A polymeric composition of claim 1 wherein the LAO/α-olefin interpolymer has at least three of the hard blocks and at least three of the soft blocks.

3. A polymeric composition of claim 2 wherein the LAO/α-olefin interpolymer is an ethylene/α-olefin interpolymer.

4. A polymeric composition of claim 1, wherein theLAO/α-olefin interpolymer is an ethylene/α-olefin interpolymer.

5. A polymeric composition of claim 1, wherein the LAO/α-olefin interpolymer is a propylene/α-olefin interpolymer.

6. A polymeric composition of claims 4 wherein the LAO/α-olefin interpolymer is a copolymer of ethylene and 1-octene, wherein the sum of the concentrations of the ethylene and 1-octene monomers is greater than 95 wt. % based on the total weight of the LAO/α-olefin interpolymer.

7. A polymeric composition of claim 6, wherein the LAO/α-olefin interpolymer is characterized by: a density from about 0.850 to about 0.895 g/cm$^3$, a Shore A hardness from about 15 to about 95; and a melt index ratio, $I_{10}/I_2$, from about 5 to about 35; and a melt index, $I_2$, from about 0.5 to about 20 g/10 min.

8. A polymeric composition of claim 7 wherein the LAO/α-olefin interpolymer is characterized by a polydispersity index, Mw/Mn, defined by the ratio of the weight average molecular weight, Mw, and the number average molecular weight, Mn, from about 1.9 to about 7.

9. A polymeric composition of claim 7 wherein the LAo/α-olefin interpolymer is characterized by a concentration of soft block(s) from about 40 to about 95 wt. % based on the total weight of the LAO/α-olefin interpolymer and the LAO/α-olefin interpolymer is characterized by a weight average block index, ABI, from about 0.15 to about 0.8.

10. A polymeric composition of claim 9 wherein the glass fiber is present at a concentration from about 5 wt. % to about 40 wt. % based on the total weight of the polymeric composition.

11. A polymeric composition of claims 10 wherein the first polymer component consists essentially of the isotactic polypropylene homopolymer.

12. A process for manufacturing a molded article wherein the molded article contains a portion having a polymeric composition of claim 1, and includes a step of removing the article from a mold.

13. A process for compounding a polymeric composition of claim 1, wherein the process comprises the steps of:

i) melt-compounding the first polymeric component, the second polymeric component, and the glass fibers to form a melt blended polymeric composition;

ii) pelletizing the melt blended polymeric composition to form pellets or granules capable of feeding in a molding machine; and iii) placing at least 5 kg of the pellets or granules in a container.

14. The polymeric composition of claim 1, wherein
the first polymeric component is the isotactic polypropylene homopolymer, the random polypropylene copolymer, the impact polypropylene, or any combination thereof;
the first polymeric component has a melt flow rate from 10 to 100 g/10 min as measured according to ISO 1133; and
the first monomer of the LAO/α-olefin interpolymer is ethylene.

15. The polymeric composition of claim 14, wherein
the first polymeric component has a melt flow rate from 20 to 100 g/10 min as measured according to ISO 1133; and
the second polymeric component is an ethylene/octene interpolymer.

16. The polymeric composition of claim 15, wherein the concentration of the glass fibers in the composition is at least 20 weight percent, the concentration of the propylene coupling agent in the composition is at least 0.1 weight percent, and the polymeric composition has a melt flow rate of at least about 5 g/10 min as measured according to ASTM D-1238 at 230° C./2.16 kg.

17. An injection molded article comprising:
an insert; and
an over-molded layer;
wherein the overmolded layer includes the polymeric composition of claim 1;
wherein the first polymeric component is a polypropylene selected from the group consisting of a polypropylene homopolymer, an impact polypropylene, a random polypropylene copolymer of ethylene and propylene having less than about 5 wt. % ethylene, and any combination thereof, wherein the polypropylene has a melting temperature greater than about 125° C. and is characterized by a melt flow rate from 10 to 100 g/10 min as measured according to ISO 1133 at 230° C./2.16 kg.

18. The molded article of claim 17, wherein
the first polymeric component has a melt flow rate from 20 to 100 g/10 min as measured according to ISO 1133; and
the second polymeric component is an ethylene/octene interpolymer.

19. The molded article of claim 18, wherein the concentration of the glass fibers in the composition is at least 5 weight percent, the concentration of the propylene coupling agent in the composition is at least 0.1 weight percent, and the polymeric composition has a melt flow rate of at least about 5 g/10 min as measured according to ASTM D-1238 at 230° C./2.16 kg.

* * * * *

UNITED STATES PATENT AND TRADEMARK OFFICE
CERTIFICATE OF CORRECTION

PATENT NO. : 9,657,166 B2  
APPLICATION NO. : 14/926604  
DATED : May 23, 2017  
INVENTOR(S) : Norwin Van Riel et al.

Page 1 of 1

It is certified that error appears in the above-identified patent and that said Letters Patent is hereby corrected as shown below:

Column 46, Line 30, delete "crystaiiinity" and insert --crystallinity--

Column 47, Line 16 and 17, delete "wherein theLAO/α-olefin" and insert --wherein the LAO/α-olefin--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*